(12) United States Patent
Noda

(10) Patent No.: US 11,739,571 B2
(45) Date of Patent: Aug. 29, 2023

(54) LINEAR RECIPROCATING-MOTION APPARATUS

(71) Applicant: ANSEI CORPORATION, Obu (JP)

(72) Inventor: Masaaki Noda, Nagoya (JP)

(73) Assignee: ANSEI CORPORATION, Obu (JP)

(*) Notice: Subject to any disclaimer, the term of this patent is extended or adjusted under 35 U.S.C. 154(b) by 312 days.

(21) Appl. No.: 16/986,847

(22) Filed: Aug. 6, 2020

(65) Prior Publication Data

US 2021/0156177 A1 May 27, 2021

(30) Foreign Application Priority Data

Nov. 25, 2019 (JP) ................................. 2019-211949

(51) Int. Cl.
E05B 83/34 (2014.01)
E05B 63/22 (2006.01)
(Continued)

(52) U.S. Cl.
CPC .............. *E05B 83/34* (2013.01); *E05B 63/22* (2013.01); *E05B 81/16* (2013.01); *E05B 81/64* (2013.01);
(Continued)

(58) Field of Classification Search
CPC .......... E05B 83/34; E05B 63/22; E05B 81/66; E05B 81/68; E05B 81/06; E05B 81/14;
(Continued)

(56) References Cited

U.S. PATENT DOCUMENTS

2010/0242363 A1 9/2010 Hirota et al.
2014/0291996 A1 10/2014 Basavarajappa et al.
(Continued)

FOREIGN PATENT DOCUMENTS

CN 109532473 A 3/2019
DE 102015005303 A1 10/2016
(Continued)

OTHER PUBLICATIONS

Annotated translation of JP H0482176 U (cited in an IDS) (Year: 1992).*
(Continued)

*Primary Examiner* — Christine M Mills
*Assistant Examiner* — Peter H Watson
(74) *Attorney, Agent, or Firm* — J-TEK LAW PLLC; Jeffrey D. Tekanic; Scott T. Wakeman

(57) ABSTRACT

A linear reciprocating-motion apparatus includes at least one movable member (10, 30) supported by a housing (90) and being capable of undergoing linear reciprocating motion in a range that includes a first position, a second position, and a third position; a stopper (50) supported by the housing to be displaceable between a blocking position that blocks the at least one movable member and a nonblocking position that does not block the at least one movable member, and is displaced to the nonblocking position in response to a specific operation; an intermittent mechanism (100, 200) that interacts with movement of the at least one movable member and assumes a specific state once every two times that the at least one movable member moves to the third position; and a switch (SW1) that, in response to the specific state, is switched from a disconnected state or a connected state to the other thereof.

16 Claims, 14 Drawing Sheets

(51) Int. Cl.
  E05B 81/16 (2014.01)
  E05B 85/02 (2014.01)
  E05B 81/64 (2014.01)
  B60K 15/05 (2006.01)
(52) U.S. Cl.
  CPC ...... *E05B 85/02* (2013.01); *B60K 2015/0584* (2013.01); *E05Y 2900/534* (2013.01)
(58) Field of Classification Search
  CPC .......... E05B 81/16; E05B 81/26; E05B 81/30; E05B 81/34; E05B 81/36; E05B 81/50; E05B 81/56; E05B 81/90; E05B 85/02; B60K 15/05; B60K 2015/0515; B60K 2015/053; B60K 2015/0561; B60K 2015/0576; B60K 2015/0584; B60K 2015/0538; E05C 5/00; E05C 5/02; E05C 2005/005; Y10T 292/0863; Y10T 292/0864; Y10T 292/0866; Y10T 292/0867; Y10T 292/0868
  See application file for complete search history.

(56) References Cited

U.S. PATENT DOCUMENTS

| | | | |
|---|---|---|---|
| 2015/0115620 A1 | 4/2015 | Ito et al. | |
| 2016/0108648 A1* | 4/2016 | Nam | B60K 15/05 292/142 |
| 2016/0348408 A1 | 12/2016 | Watanabe | |
| 2017/0043660 A1 | 2/2017 | Horikawa et al. | |
| 2018/0029469 A1 | 2/2018 | Persiani et al. | |
| 2018/0105036 A1 | 4/2018 | Guardianelli | |
| 2020/0156612 A1 | 5/2020 | Ikuma et al. | |
| 2020/0217122 A1 | 7/2020 | Noguchi et al. | |
| 2021/0039620 A1 | 2/2021 | Mitsugi et al. | |
| 2021/0061092 A1 | 3/2021 | Noda | |
| 2021/0070165 A1 | 3/2021 | Noda | |
| 2021/0172234 A1 | 6/2021 | Rampalli et al. | |

FOREIGN PATENT DOCUMENTS

| | | |
|---|---|---|
| DE | 102015005646 A1 | 11/2016 |
| EP | 1227948 B1 | 12/2003 |
| EP | 3078531 A1 | 10/2016 |
| EP | 3078792 A1 | 10/2016 |
| EP | 3265333 A1 | 1/2018 |
| EP | 3348432 A1 | 7/2018 |
| JP | H0482176 U | 7/1992 |
| JP | 2003113687 A | 4/2003 |
| JP | 2015086606 A | 5/2015 |
| JP | 2015132085 A | 7/2015 |
| JP | 2015209689 A | 11/2015 |
| JP | 2016223150 A | 12/2016 |
| JP | 2017043893 A * | 3/2017 |
| JP | 2017043893 A | 3/2017 |
| JP | 2017043894 A | 3/2017 |
| JP | 2017043939 A | 3/2017 |
| JP | 6350451 B2 | 7/2018 |
| JP | 3219522 U | 12/2018 |
| WO | 0128798 A1 | 4/2001 |
| WO | 2016139690 A1 | 9/2016 |

OTHER PUBLICATIONS

Improved translation of JP H0482176 U (Year: 1992).*
Annotated machine translation of JP 2017043893 A (Year: 2017).*
Office Action from the United States Patent Office dated Apr. 8, 2022 in related U.S. Appl. No. 16/814,488, including examined claims 1-20.
Office Action dated May 19, 2022, in related U.S. Appl. No. 16/814,391.
Unpublished U.S. Appl. No. 16/814,391.
Unpublished U.S. Appl. No. 16/814,488.
Extended European Search Report from the European Patent Office dated Oct. 5, 2020, in related EP application No. 20 16 1445, including Search Opinion, Search Report and examined claims 1-12.
Extended European Search Report from the European Patent Office dated Feb. 12, 2021 in related EP application No. 20190279.8, including Search Opinion, Search Report and examined claims 1-9.
Machine Translation of Search Report from the Japanese Patent Office dated Jan. 26, 2022, in related JP application No. 2019-162890, which includes translation of examined claims 1-3.
Office Action and Search Report from the Japanese Patent Office dated Feb. 1, 2022 in related JP application No. 2019-211949; including machine translation thereof and of examined claims 1-9.
Office Action and Search Report from the Japanese Patent Office dated Feb. 1, 2022, in related JP application No. 2019-153422, including machine translation thereof and of examined claims 1-5.
Office Action from the European Patent Office dated Nov. 18, 2021 in related EP application No. 20161445.0, including examined claims 1-12.
Office Action from the European Patent Office dated Nov. 18, 2021 in related EP application No. 20161722.2, including examined claims 1-9.
Extended European Search Report from the European Patent Office dated Oct. 6, 2020, in related EP application No. 20 16 1722, including Search Opinion and Search Report and examined claims 1-11.

* cited by examiner

LINEAR RECIPROCATING-MOTION APPARATUS

TECHNICAL FIELD

The present invention generally relates to a linear reciprocating-motion apparatus for use, e.g., in a vehicle to open and close a lid (lid body), and may be used in an apparatus for opening and closing/latching the vehicle lid (lid body), which is also known as a fuel door or gas tank door in gasoline-powered vehicles or a charge port door in electric vehicles.

BACKGROUND ART

Japanese Laid-open Patent Publication No. 2017-43939 discloses an example of a known linear reciprocating-motion apparatus that is utilized in vehicles. The linear reciprocating-motion apparatus comprises a housing, a lock shaft, a latch, a pawl, and a switch.

The lock shaft is one example of a movable member. The lock shaft is supported by the housing; is capable of undergoing linear reciprocating motion in a range that includes a first position, a second position, and a third position, which is separated (spaced apart) from the first position more than the second position; and is biased toward the first position.

The latch is coupled to a linearly-movable shaft, which is a portion of the lock shaft, and is pivotably supported by the housing. A latching surface is formed on the latch. The pawl is supported by the housing. The pawl is pivotable between a blocking position, at which it engages the latching surface and prohibits the lock shaft from moving from the second position to the first position, and a nonblocking position, at which it is spaced apart from the latching surface and permits the lock shaft to move from the second position to the first position. The pawl is biased toward the blocking position and is displaced to the nonblocking position by an electric actuator that is energized by a control apparatus when induced by a specific operation for moving the lock shaft to the first position, i.e. a manual operation that moves the lock shaft held at the second position to the third position.

The switch is provided on the housing. Each time the manual operation that moves the lock shaft to the third position is repeated, the switch is pressed by a first contact piece of the latch, which interacts with the linear reciprocating motion of the lock shaft, and is switched from the disconnected state to the connected state.

In this known linear reciprocating-motion apparatus, the control apparatus ascertains that the switching of the switch was caused by the manual operation that moves the lock shaft to the third position, and only when the switch has switched from the disconnected state to the connected state under specific conditions, executes control so as to energize the electric actuator. Then, when the pawl is displaced to the nonblocking position by the energized electric actuator, the lock shaft is displaced to the first position.

However, with the above-described known linear reciprocating-motion apparatus, it is necessary for the control apparatus to ascertain the switching of the switch and determine whether the switch has switched from the disconnected state to the connected state under the specific conditions. Therefore, it is difficult to simplify the electrical circuitry for the switch, and the electronic control program tends to become complicated. Furthermore, in the event that a so-called bug in the program occurs, there is a risk that the control apparatus might make an erroneous determination with respect to the switch, thereby possibly causing the linear reciprocating-motion apparatus to malfunction.

SUMMARY OF THE INVENTION

Accordingly, one non-limiting object of the present teachings is to disclose a linear reciprocating-motion apparatus that can further improve reliability by simplifying the electrical circuitry for the switch.

In one aspect of the present teachings, a linear reciprocating-motion apparatus comprises:

a housing;

a movable member that is supported by the housing, is capable of undergoing linear reciprocating motion in a range that includes: a first position, a second position, and a third position that is separated (spaced apart) from the first position more than the second position, and is biased toward the first position;

a stopper that: (i) is supported by the housing, (ii) is displaceable between a blocking position at which movement of the movable member from the second position to the first position is prohibited and a nonblocking position at which movement of the movable member from the second position to the first position is permitted, (iii) is biased toward the blocking position, and (iv) is displaced to the nonblocking position when induced by (in response to) a specific operation for moving the movable member to the first position;

an intermittent mechanism that interacts with the linear reciprocating motion of the movable member and assumes a specific state once every two times when the movable member repeats the action of moving to the third position; and a switch that is provided in the housing and, when the specific state is assumed, is switched from one of a disconnected state and a connected state to the other of the disconnected state and the connected state.

With the linear reciprocating-motion apparatus of this aspect of the present teachings, the intermittent mechanism has the above-mentioned configuration. Therefore, when the movement of the movable member to the third position is repeated, once every two times the switch is switched from one of the disconnected state and the connected state to the other of the disconnected state and the connected state. Owing to such intermittent switching of the switch, there is no need to interpose complex electrical circuitry, such as a control apparatus; for example, it is possible to energize the electric actuator so as to displace the stopper to the nonblocking position; it is possible to switch the power ON and OFF to a light that illuminates the vicinity of the housing; and the like. That is, because mechanical control (actuation) is used in the linear reciprocating-motion apparatus of the above-mentioned aspect, malfunctions due to bugs in electronic control programs do not readily occur.

Accordingly, the linear reciprocating-motion apparatus of this aspect of the present teachings can further improve reliability by enabling the electrical circuitry for the switch to be simplified.

In another aspect of the present teachings, it is preferable that the intermittent mechanism comprises: a first intermittent-guide part that is displaceably supported by the housing and on which is formed a first intermittent profile, which includes a fourth position and a fifth position; and a first interacting mechanism that is displaceably supported by the housing, includes a first guided part, which is guided by the first intermittent profile, and is adapted/configured to displace (move) the first guided part by interacting with the linear reciprocating motion of the movable member. Furthermore, it is preferable that, each time the first intermittent-guide part is repetitively moved by the movable member moving to the third position, the first intermittent-guide part guides the first guided part alternately to the fourth position or to the fifth position. The point in time at which the first guided part has been guided to the fifth position is defined as the specific state.

Because the intermittent mechanism of the above-mentioned aspect comprises the first intermittent-guide part and the first interacting mechanism, it is possible to reliably perform the action of switching the switch from one of the disconnected state and the connected state to the other of the disconnected state and the connected state once every two times.

In another aspect of the present teachings, it is preferable that the first intermittent profile includes a maximum separation position that is most separated (spaced apart) from the fourth position and the fifth position, and an intermediate stopping position that is positioned between the maximum separation position and a range that includes the fourth position and the fifth position. It is preferable that the first intermittent-guide part is biased so as to displace (move) the fourth position and the fifth position of the first intermittent profile in a direction (leading) away from the first interacting mechanism, and the fourth position is spaced apart from the first interacting mechanism farther than the fifth position. It is preferable that the first guided part is adapted/configured to cycle (move) around, in order, the maximum separation position, the fourth position, the intermediate stopping position, and the fifth position. Furthermore, it is preferable that a restricting part is formed on the first intermittent profile and is disposed between the maximum separation position and the fourth position. The restricting part restricts (blocks) a change in path of the first guided part toward the intermediate stopping position as the first guide part is being guided from the maximum separation position to the fourth position.

In such an embodiment, it is noted that, after the first guided part has been guided to the fifth position and it is time to be guided to the fourth position by the next movement of the movable member to the third position, there are situations in which: (i) the movable member moves at a slow speed from the first position, passes the second position, and moves to the third position; (ii) the movable member moves from the first position, passes the second position, immediately thereafter halts and is held at the second position, and thereafter moves from the second position to the third position; or the like. In these situations, if no countermeasures are taken, when the movable member passes the second position, the first intermittent-guide part would, by being biased, adversely (undesirably) displace in the direction that separates (spaces apart) the fourth position and the fifth position of the first intermittent profile from the first interacting mechanism. Therefore, there is a risk of the problem that the first guided part will skip the turn of the fourth position and will be adversely (undesirably) guided to the fifth position via the intermediate stopping position. In this regard, because the restricting part of the linear reciprocating-motion apparatus of this aspect restricts (blocks) the first guided part from changing its path of movement (i.e. to an undesirable path of movement), such a problem can be prevented with high reliability.

In another aspect of the present teachings, it is preferable that, when guided to the intermediate stopping position, the first guided part is held at the intermediate stopping position by being pressed against a guide wall that extends from the fifth position on the first intermittent profile toward the maximum separation position.

In such an embodiment, the strength of the guide wall can be easily increased, so that the guide wall can reliably receive (support) the first guided part guided to the intermediate stopping position. Therefore, not only can the first guided part be reliably held at the intermediate stopping position, but damage to the first intermittent-guide part can be minimized or avoided.

In another aspect of the present teachings, it is preferable that an island part is formed in the center of the first intermittent profile and includes the restricting part and a recessed part that is recessed toward the maximum separation position on the fifth-position side of the restricting part. Furthermore, it is preferable that the first guided part is held at the intermediate stopping position by entering the recessed part of the island part when being guided to the intermediate stopping position.

In such an embodiment, the recessed part of the island part can reliably receive (support) the first guided part that is being guided to the intermediate stopping position, and therefore the first guided part can be reliably held at the intermediate stopping position.

In another aspect of the present teachings, it is preferable that the intermittent mechanism comprises: a second intermittent-guide part that is non-displaceably provided on the housing and on which is formed a second intermittent profile, which includes a sixth position and a seventh position; and a second interacting mechanism that is displaceably supported by the housing, includes a second guided part, which is guided by the second intermittent profile, and is adapted/configured to displace (move) the second guided part by interacting with the linear reciprocating motion of the movable member. Furthermore, it is preferable that, each time the movable member repeatedly performs the action of moving (repeatedly moves) to the third position, the second intermittent-guide part guides the second guided part alternately between the sixth position and the seventh position. The point in time at which the second guided part has been guided to the seventh position is defined as the specific state.

Because the intermittent mechanism of this aspect comprises the second intermittent-guide part and the second interacting mechanism, it is possible to reliably perform the action of switching the switch from one of the disconnected state and the connected state to the other of the disconnected state and the connected state once every two times.

In another aspect of the present teachings, it is preferable that the linear reciprocating-motion apparatus is used in a vehicle and is provided between an opening on a vehicle body and a lid body (lid) that is capable of opening/closing (adapted/configured to open and close) the opening. It is preferable that the lid body is displaceable in a (pivot) range that includes: an open position at which the opening is open, a closed position at which the opening is closed, and a pressed-in position at which the lid body is pressed in from the closed position to the side opposite the open position. It is preferable that, in the linear reciprocating-motion apparatus, the housing is provided on the vehicle body. It is preferable that the movable member extends centered on an axial center passing through the opening and is capable of undergoing linear reciprocating motion in the direction of the axial center in a (linear) range that includes: the first position corresponding to the open position, the second position corresponding to the closed position, and the third position corresponding to the pressed-in position. Furthermore, it is preferable that the specific operation is a manual opening operation for displacing the lid body to the open position.

In such an embodiment, because the linear reciprocating-motion apparatus is used in vehicles, the electrical circuitry for the switch can be simplified and further improvements in reliability can be achieved.

In another aspect of the present teachings, it is preferable that the linear reciprocating-motion apparatus comprises an electric actuator that is provided in the housing, is operably connected to the stopper and displaces the stopper to the nonblocking position when energized upon being induced by (in response to) the manual opening operation.

In such an embodiment, because the stopper is adapted/configured to be displaced to the nonblocking position by the electric actuator, the manual opening operation performed by the user can be simplified, and therefore the holding of the lid body can be easily released.

In another aspect of the present teachings, it is preferable that the movable member comprises: a linearly-movable shaft that extends centered on the axial center, is supported by the housing such that it is nonrotatable around the axial center and is capable of undergoing linear reciprocating motion in the direction of the axial center in the (linear) range that includes: the first position, the second position, and the third position, and is biased toward the first position; and a rotary shaft that extends centered on the axial center, is supported by the linearly-movable shaft such that it is rotatable around the axial center and capable of undergoing linear reciprocating motion in the direction of the axial center, is rotatable to a latched position that latches the lid body when the linearly-movable shaft is disposed in the second position or the third position and is rotatable to an unlatched position that does not latch the lid body when the linearly-movable shaft is disposed in the first position.

Owing to the movable member having such a specific configuration, the linear reciprocating-motion apparatus according to the above-mentioned aspect can be suitably used in a vehicle or industrial machinery.

Other aspects and advantages of the present invention should be clear from embodiments explained in the following description and shown in the attached drawings, from the illustrations shown in these drawings, and from the concept or gist of the present invention disclosed overall in the specification and these drawings.

DETAILED DESCRIPTION OF EMBODIMENTS

Working Examples 1-3 according to the present teachings are explained below, with reference to the drawings.

Working Example 1

Figure 1:
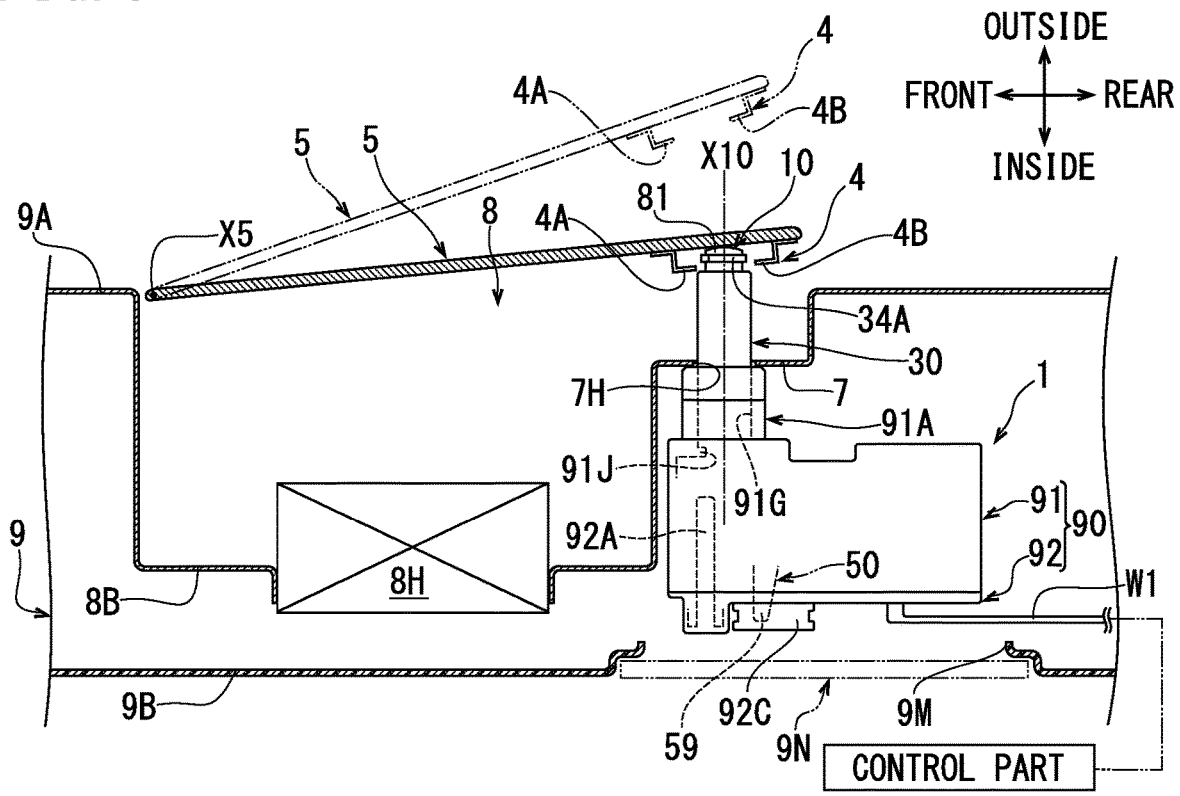
FIG. 1 is a schematic, partial, cross-sectional view of a vehicle that utilizes a linear reciprocating-motion apparatus according to Working Example 1 of the present teachings and shows the state in which a lid body (fuel door) is in an open position and a linearly-movable shaft is in a first position.
Figure 2:
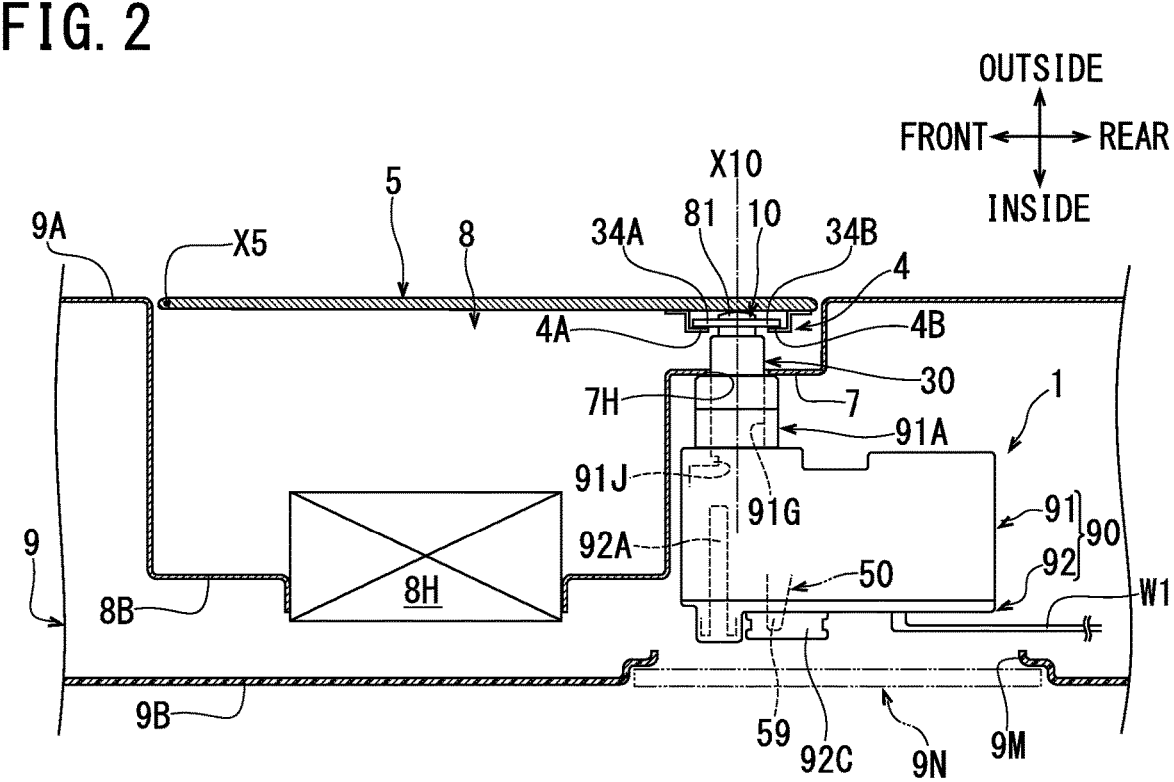
FIG. 2 is a schematic, partial, cross-sectional view of the linear reciprocating-motion apparatus, the same as in FIG. 1, and shows the state in which the lid body is in a closed position and the linearly-movable shaft is in a second position.
Figure 3:
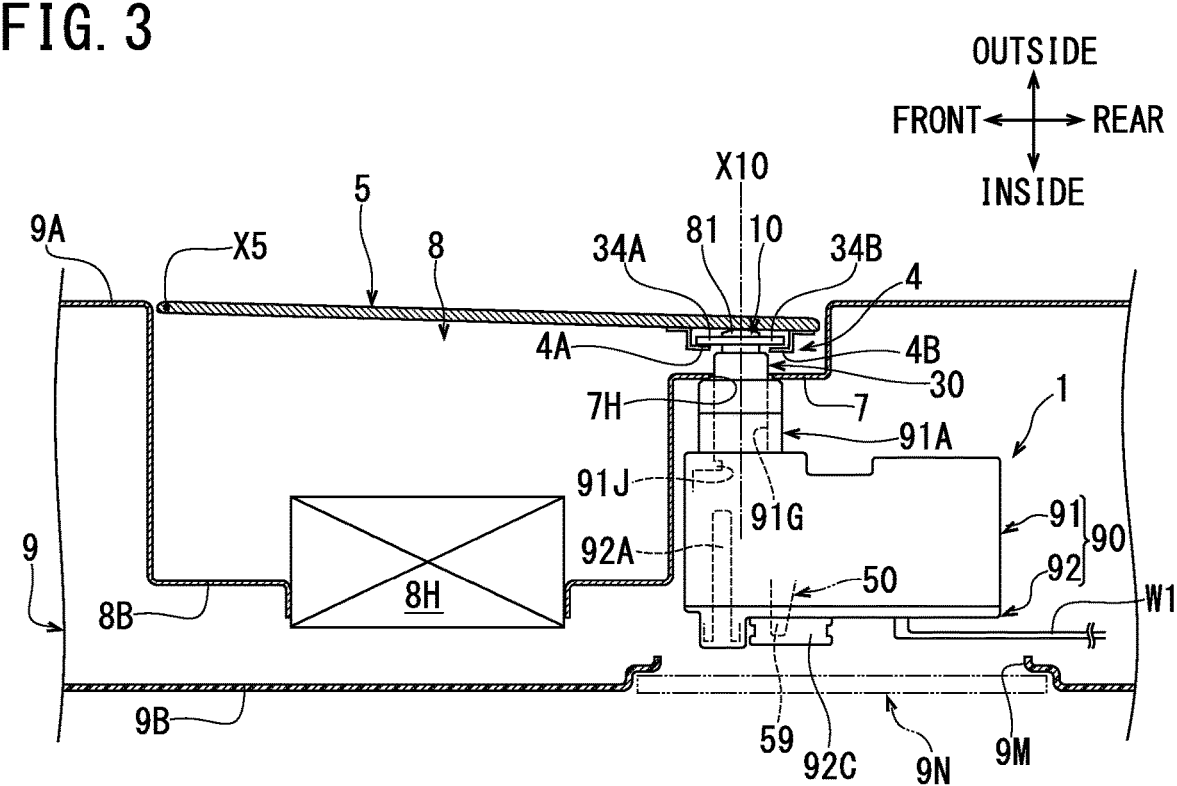
FIG. 3 is a schematic, partial, cross-sectional view of the linear reciprocating-motion apparatus, the same as in FIG. 1, and shows the state in which the lid body is in a pressed-in position and the linearly-movable shaft is in a third position.

FIGS. 1-4 show a specific embodiment of a linear reciprocating-motion apparatus 1 for use in vehicles according to Working Example 1 of the present teachings. The linear reciprocating-motion apparatus 1 is designed to be utilized, e.g., in a vehicle such as an automobile, a bus, an industrial vehicle, or the like. FIGS. 1-3 show a rear-side portion on the right-side surface of a vehicle body 9 of the vehicle.

The front and rear directions shown in FIGS. 1-3 are based on the front and rear directions of the vehicle. In addition, the vehicle-inside direction and the vehicle-outside direction shown in FIGS. 1-3 are based on the perspective of a person sitting inside the vehicle cabin, where the right-side surface of the vehicle is the vehicle outer side, and the opposite side is the vehicle inner side, i.e. the cabin side. Furthermore, the direction coming out of the plane of the paper in FIGS. 1-3 is the upper side of the vehicle, i.e. the roof side, whereas the direction going back from the plane of the paper in FIGS. 1-3 is the lower side of the vehicle, i.e. the floor side. The front-rear direction, the vehicle inside-outside direction, and the up-down direction in FIG. 4 and thereafter are shown corresponding to FIGS. 1-3.

Configuration of the Vehicle Opening, Fuel Door (Lid Body), Etc.

As shown in FIG. 1, the vehicle body 9 has a body panel 9A and an inner panel 9B. The body panel 9A constitutes a right-side exterior surface of the vehicle body 9. The inner panel 9B is disposed on the inner side of the vehicle relative to the body panel 9A and partitions off adjacent vehicle compartments such as the trunk.

An opening 8 is provided on the body panel 9A of the vehicle body 9. The opening 8 is a recessed part that is formed such that one portion of the body panel 9A recesses toward the inner side of the vehicle from the right-side surface of the vehicle body 9 and is open toward the right-side surface of the vehicle body 9. The opening 8 has a bottom wall 8B and a support wall 7.

The bottom wall 8B extends substantially planarly in the front-rear direction and the up-down direction, forming the bottom surface of the opening 8. A fuel-filling hole 8H is disposed in the center of the bottom wall 8B. In electric vehicles, the fuel-filling hole 8H is replaced with a charging port.

The support wall 7 extends substantially planarly in the front-rear direction and the up-down direction at a location rearward of the bottom wall 8B and on the vehicle outer side, forming a portion of the inner-wall surface of the opening 8. A through hole 7H is formed so as to pass through the support wall 7. The through hole 7H is a round hole centered on axial center X10. Axial center X10 extends in the vehicle inside-outside direction and passes through the opening 8.

A substantially planar fuel door (hereinafter, "lid body") 5 is supported on the body panel 9A of the vehicle body 9 such that it is pivotable about opening/closing axial center X5. Opening/closing axial center X5 extends in the up-down direction along an opening edge on the front side of the opening 8. The lid body 5 is pivotable in a (pivot) range that includes: an open position shown in FIG. 1, a closed position shown in FIG. 2, and a pressed-in position shown in FIG. 3. Although the term "lid body" is utilized herein for the structure 5 that opens and closes the opening 8, other terms may be utilized, such as fuel door, fuel door cover, fuel lid, charging port cover, charging port door, charging port lid, etc. All of these terms are intended to be synonymous.

FIG. 1 shows, in solid line and chain double-dashed line, respectively, two exemplary open positions of the lid body 5. By pivoting to an open position, the lid body 5 is displaced (moved) to a position where its rearward end is farther outward of the vehicle than the outer surface of the body panel 9A, thus opening the opening 8.

As shown in FIG. 2, by pivoting to the closed position, the outer surface of the lid body 5 is flush with the outer surface of the body panel 9A, thus constituting a portion of the design surface of the vehicle body 9, and also closing the opening 8.

As shown in FIG. 3, by pivoting to the pressed-in position, the lid body 5 is displaced (moved, pivoted) such that its rearward end is disposed farther toward the inner side of the vehicle than the outer surface of the body panel 9A, and is thus pressed inwardly of the body panel 9A on the side opposite the open position.

As shown in FIG. 2, a lid-body latching part 4, which includes a pair of latching flanges 4A, 4B, is fixed on the surface of the lid body 5 on the rearward end that faces the inner side of the vehicle. The front latching flange 4A and the rear latching flange 4B each protrude toward the inner side of the vehicle and then bend, extending so as to approach each other in the front-rear direction.

The tip of the front latching flange 4A and the tip of the rear latching flange 4B oppose one other with a prescribed spacing between them in the front-rear direction. When the lid body 5 is in the closed position, axial center X10 passes through an intermediate position between the tip of the front latching flange 4A and the tip of the rear latching flange 4B.

A maintenance opening 9M and an opening cover 9N are provided in/on the inner panel 9B of the vehicle body 9. The maintenance opening 9M is formed in the inner panel 9B rearward of the fuel-filling hole 8H. The maintenance opening 9M passes through the inner panel 9B and is sized such that the linear reciprocating-motion apparatus 1 can pass through the maintenance opening 9M.

The opening cover 9N is removably mounted on the inner panel 9B, thereby closing the maintenance opening 9M. The opening cover 9N is removable, e.g., by an assembler at the time of attaching the linear reciprocating-motion apparatus 1 during the manufacture of the vehicle or by a mechanic when attaching or removing the linear reciprocating-motion apparatus 1 for work such as maintenance or repair work. Thereby, it is possible to perform the above-described work easily by inserting a hand into the space between the body panel 9A and the inner panel 9B via the opened maintenance opening 9M.

Configuration of Linear Reciprocating-Motion Apparatus

As shown in FIGS. 1-3, the linear reciprocating-motion apparatus 1 is provided between the opening 8 and the lid body 5 and is configured/adapted for opening and closing the lid body 5.

Figure 5:
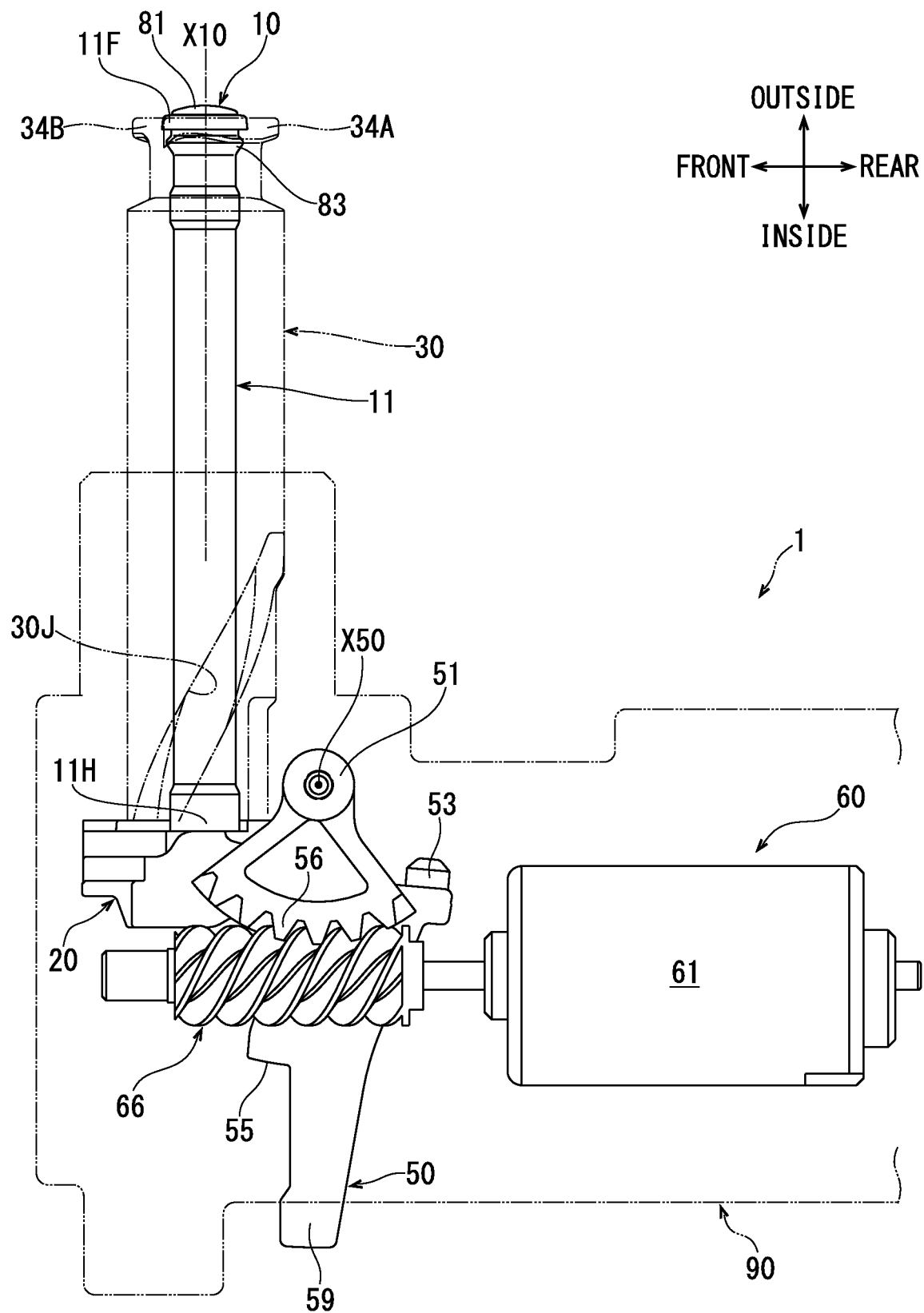
FIG. 5 is a top view showing the positional relationships among the linearly-movable shaft, a rotary shaft, a stopper, and an electric actuator.
Figure 6:
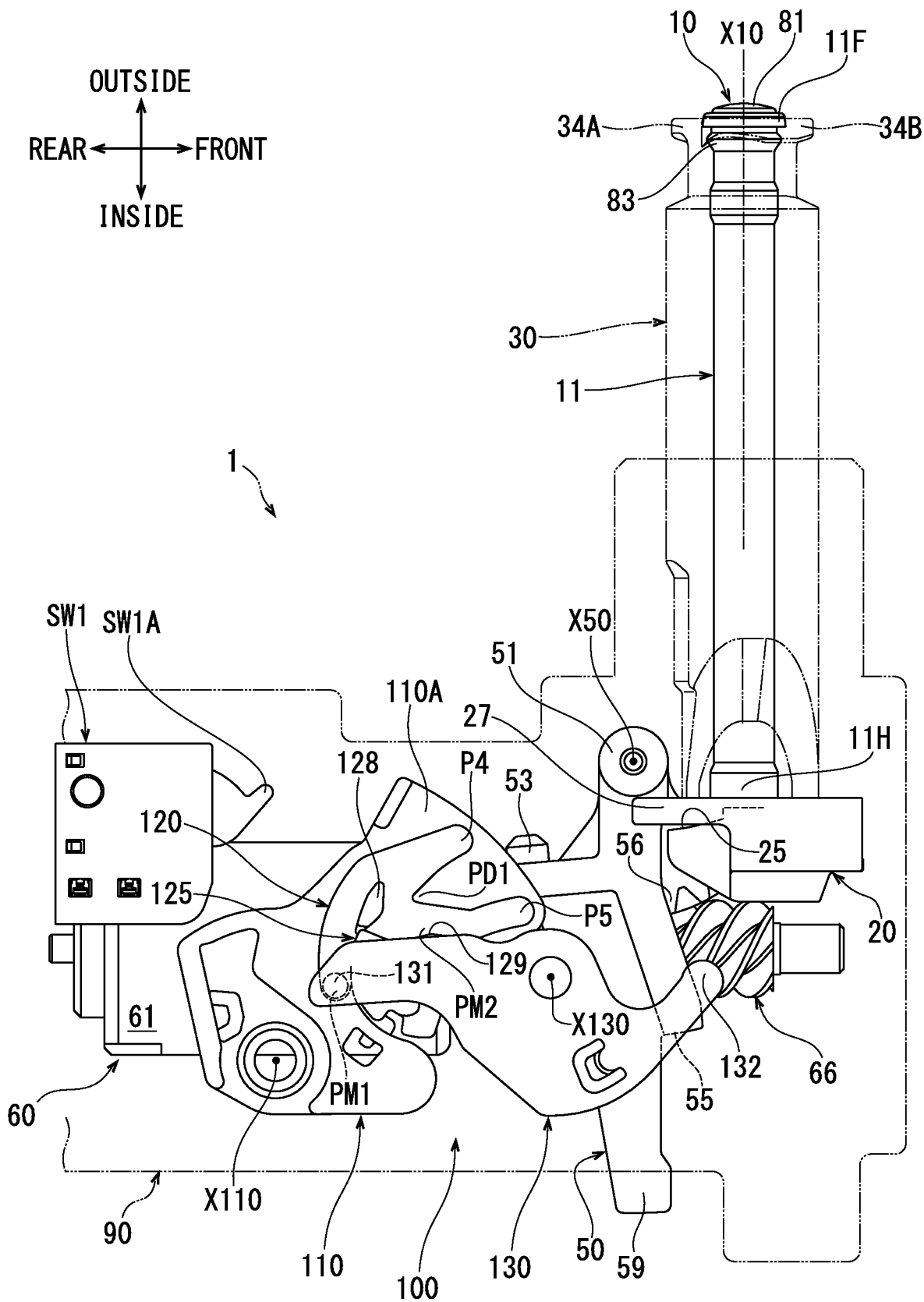
FIG. 6 is a bottom view showing the positional relationships among the linearly-movable shaft, the rotary shaft, the stopper, the electric actuator, a first intermittent-guide part, a first interacting mechanism, and a switch.
Figure 7:
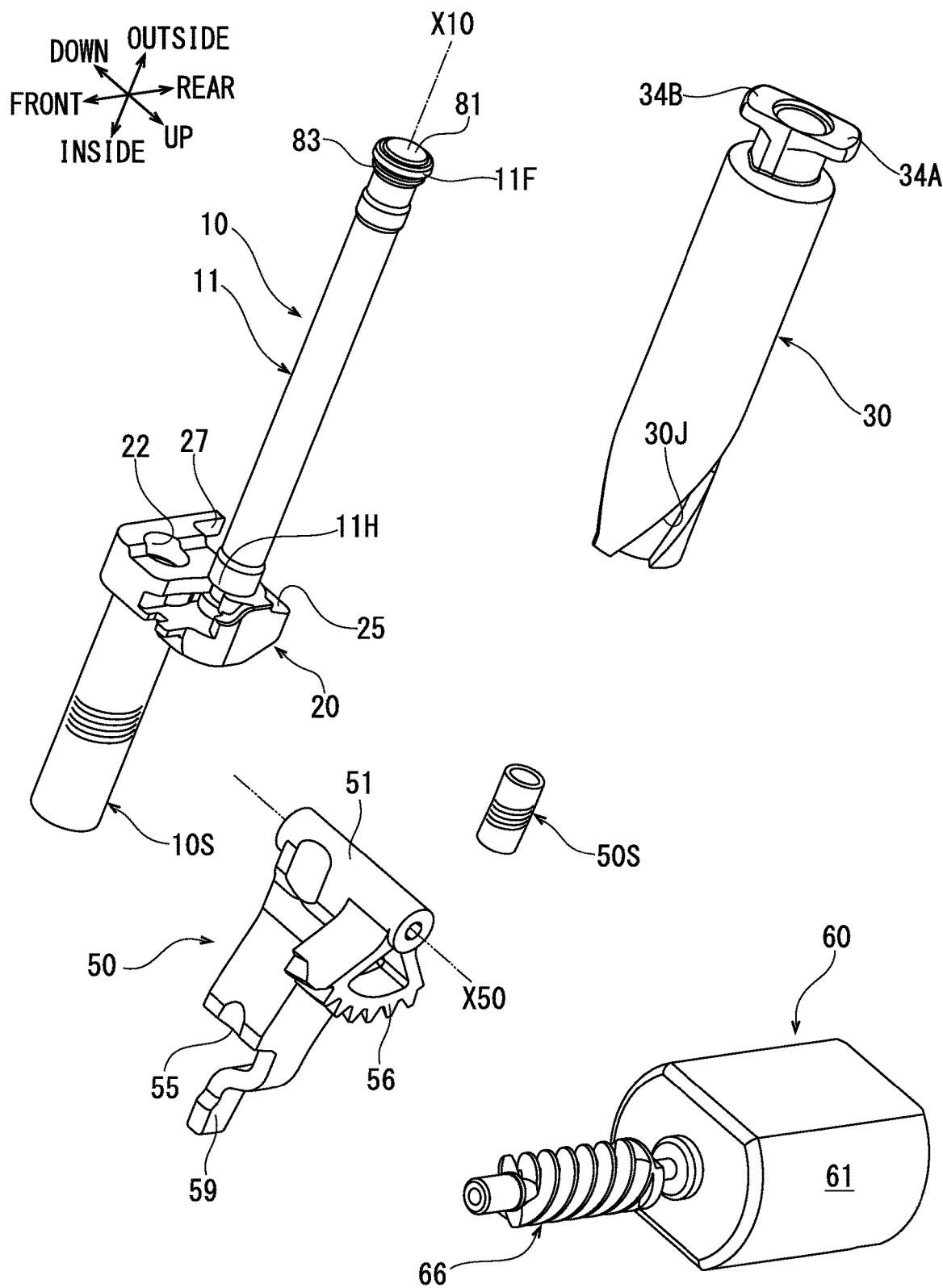
FIG. 7 is an exploded oblique view of the linearly-movable shaft, the rotary shaft, the stopper, and the electric actuator.

The linear reciprocating-motion apparatus 1 comprises a housing 90 as shown in FIGS. 1-4, a linearly-movable shaft 10 as shown in FIGS. 5-15, a rotary shaft 30 as shown in FIGS. 1-7, a compression-coil spring 10S as shown in FIG. 7, a stopper 50 as shown in FIGS. 5-7 and 9, and a compression-coil spring 50S as shown in FIG. 7. The linearly-movable shaft 10 and the rotary shaft 30 are representative, non-limiting examples of "movable members" according to the present teachings.

In addition, the linear reciprocating-motion apparatus 1 comprises an electric actuator 60 as shown in FIGS. 5-7, and a switch SW1 and an intermittent mechanism 100 as shown in FIGS. 6, 8, and 10-15.

Housing

As shown in FIG. 1, the housing 90 is provided on the vehicle body 9 by being fastened to fixing members (not shown) disposed between the body panel 9A and the inner panel 9B of the vehicle body 9. As shown in FIGS. 1-4, the housing 90 includes a housing body 91 and a housing case (housing cover) 92.

The housing body 91 is a substantially box-shaped body and has an open side on the surface that faces the inner side of the vehicle. A tubular guide 91A is formed on a front portion of the surface of the housing body 91 facing the outer side of the vehicle. The tubular guide 91A has a circular-tube shape centered on axial center X10 and protrudes toward the outer side of the vehicle.

As shown in FIG. 1, the inner-circumferential surface of the tubular guide 91A serves as a guide surface 91G for enabling the linearly-movable shaft 10 and the rotary shaft 30 to undergo linear reciprocating motion in the direction of axial center X10. In addition, a guide protrusion 91J is formed on the inner side of the housing body 91 and enables the rotary shaft 30 to be rotatable about axial center X10.

As shown in FIGS. 1-4, the housing case 92 is assembled (mounted) on the open side of the housing body 91 having the surface that faces the inner side of the vehicle. The housing case 92, together with the housing body 91, partitions off (encloses) a storage space of (within) the housing 90.

Stored within the storage space of the housing 90 are: the portions of the linearly-movable shaft 10 and the rotary shaft 30 that are located on the inner side of the vehicle (within the body panel 9A), as well as the compression-coil spring 10S, the stopper 50, the compression-coil spring 50S, the electric actuator 60, the intermittent mechanism 100, and the switch SW1.

As shown in FIG. 1, a shaft-shaped guide 92A is formed on (extends from) the front portion of the housing case 92 and enables the linearly-movable shaft 10 to undergo linear reciprocating motion in the direction of axial center X10. The shaft-shaped guide 92A has a circular-cylindrical shaft shape centered on an axial center that extends parallel to axial center X10, i.e. the axial center of the shaft-shaped guide 92A is offset relative to axial center X10. Furthermore, the shaft-shaped guide 92A protrudes within the housing 90 toward the outer side of the vehicle.

Although omitted from FIGS. 1-3, the compression-coil spring 10S shown in FIG. 7 is mounted around the shaft-shaped guide 92A. In addition, although omitted from the figures, holding (support) parts are formed on the housing case 92 to respectively hold (support) the stopper 50, the compression-coil spring 50S, the electric actuator 60, the intermittent mechanism 100, and the switch SW1, which are shown in FIG. 7, together with the housing body 91.

Figure 4:
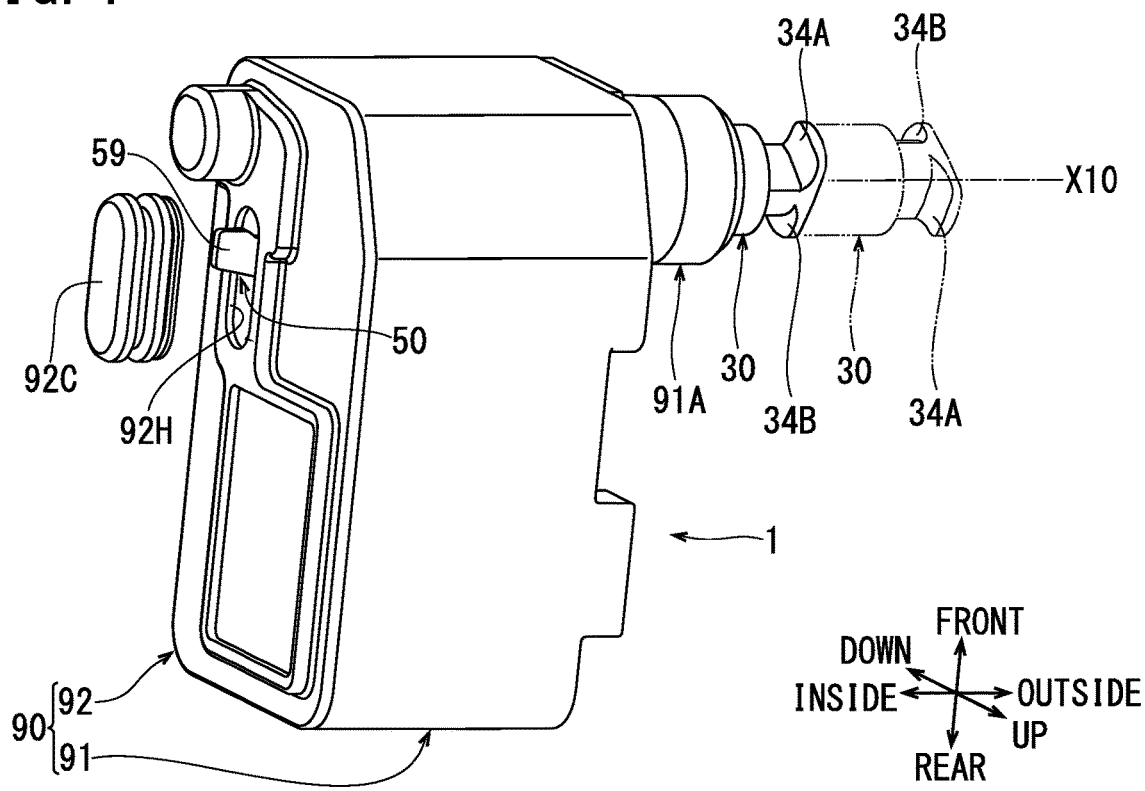
FIG. 4 is an oblique view of the linear reciprocating-motion apparatus according to Working Example 1.

As shown in FIG. 4, a slot 92H extending in the front-rear direction is formed in the housing case 92 such that it passes through in the vehicle inside-outside direction. The slot 92H is covered by a rubber cap 92C as shown in FIGS. 1 and 4.

Linearly-Movable Shaft and Rotary Shaft

As shown in FIGS. 5-8, the linearly-movable shaft 10 comprises a linearly-movable-shaft main body 11 and a block (actuator/engagement flange) 20.

The linearly-movable-shaft main body 11 is a substantially circular-cylindrical shaft that extends centered on axial center X10. The linearly-movable-shaft main body 11 includes a base-end portion 11H, which is one end portion of the linearly-movable-shaft main body 11 that is located on the side opposite to the lid body 5 in the direction of axial center X10, i.e. on the inner side of the vehicle. A terminal end (tip) of the linearly-movable-shaft main body 11 is the other end portion of the linearly-movable-shaft main body 11 that is located on the lid body 5 side in the direction of axial center X10, i.e. toward the outer side of the vehicle.

A flange part 11F is formed on (at) the terminal end portion (tip) of the linearly-movable-shaft main body 11. The flange part 11F protrudes in the radial direction of axial center X10 more than other portions of the linearly-movable-shaft main body 11.

In addition, a cushioning part 81 and a sealing part 83 are provided on the terminal end portion (tip) of the linearly-movable-shaft main body 11. The cushioning part 81 and the sealing part 83 are made of elastic materials, for example, rubber, elastomers, soft resins, or the like, that are softer (more elastic) than the polymer (resin) materials constituting the other (rigid) portions of the linearly-movable-shaft main body 11.

The cushioning part 81 protrudes toward the outer side of the vehicle from the flange part 11F, i.e. toward the lid body 5. The sealing part 83 is formed in a ring shape around axial center X10 toward the inner side of the vehicle from the flange part 11F.

Figure 8:
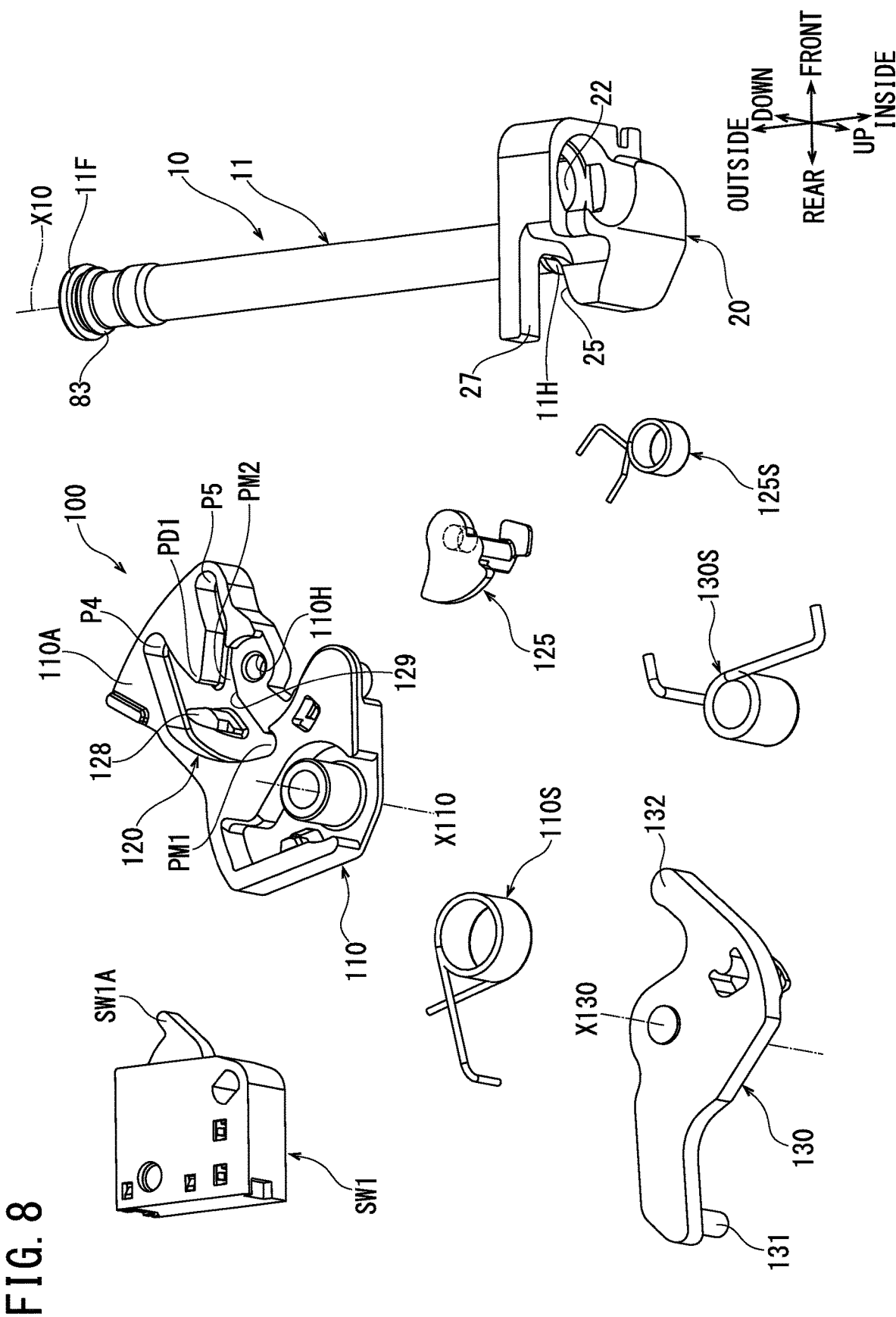
FIG. 8 is an exploded oblique view of the linearly-movable shaft, the first intermittent-guide part, the first interacting mechanism, and the switch.

The block 20 is a substantially block-shaped member made of polymer (resin) that is fixed to the base-end portion 11H of the linearly-movable-shaft main body 11 and that is movable integrally with the linearly-movable-shaft main body 11. As shown in FIGS. 7 and 8, a shaft-shaped guide insertion hole 22, an engagement part 25, and an actuating part 27 are formed in/on the block 20.

The shaft-shaped guide insertion hole 22 is a round hole that passes, in a direction parallel to axial center X10, through a portion of the block 20 that is offset downward and forward of the linearly-movable-shaft main body 11.

Although omitted from the figures, by inserting the shaft-shaped guide 92A shown in FIG. 1 through the shaft-shaped guide insertion hole 22, the linearly-movable shaft 10 is supported by the housing 90 such that it can undergo linear reciprocating motion in (along) the direction of axial center X10.

In addition, because the shaft-shaped guide insertion hole 22 and the shaft-shaped guide 92A are offset relative to axial center X10 (i.e. offset relative to the tubular guide 91A, in which the linearly-movable shaft 10 and the rotary shaft 30 are inserted), the linearly-movable shaft 10 is supported by the housing 90 such that it is nonrotatable around axial center X10.

When the shaft-shaped guide 92A shown in FIG. 1 is inserted through the shaft-shaped guide insertion hole 22, one end of the compression-coil spring 10S makes contact with the block 20, as shown in FIG. 7. Thereby, the compression-coil spring 10S biases the linearly-movable shaft 10 toward the outer side of the vehicle.

Figure 9:
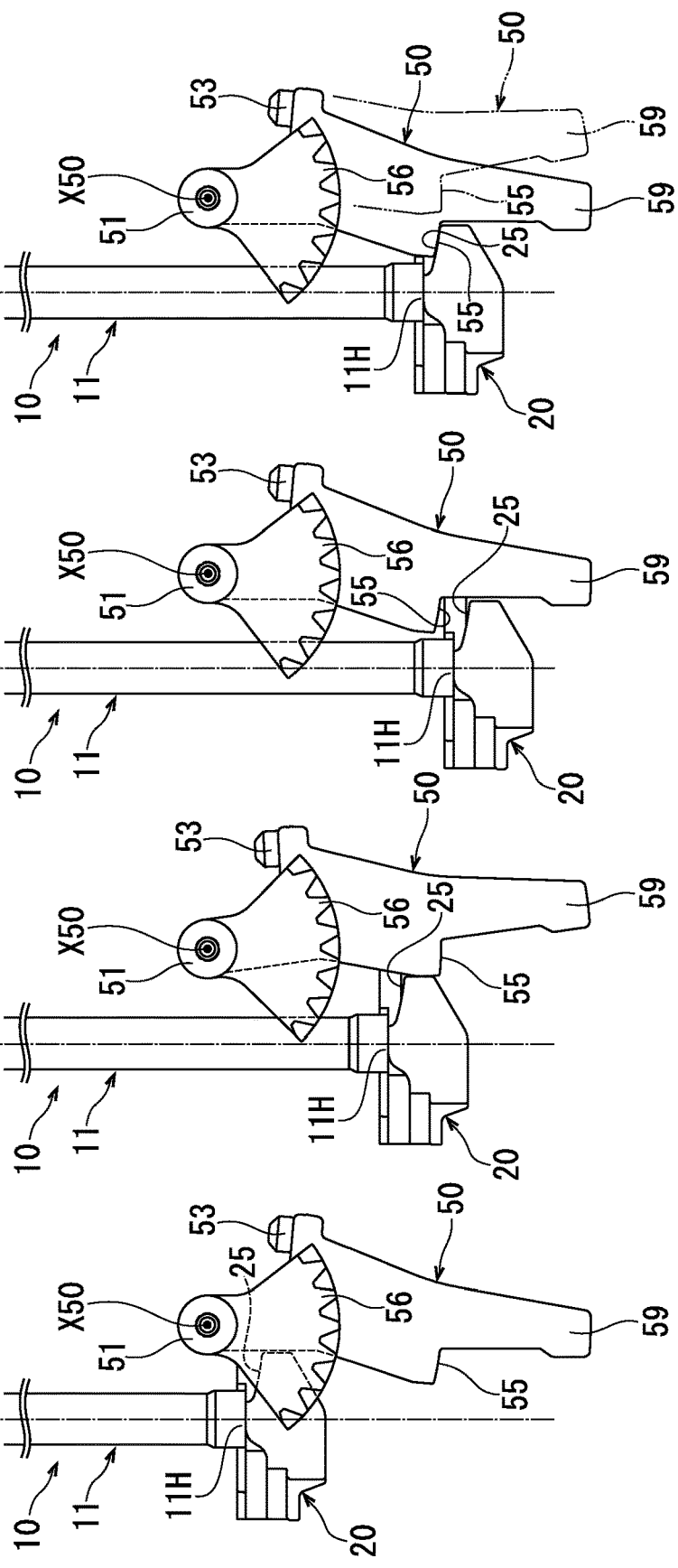
FIGS. 9A-9D are schematic diagrams used to describe coordinated movements of a block of the linearly-movable shaft and the stopper.

As shown in FIGS. 7 and 9, the engagement part 25 is a tilted surface that faces the outer side of the vehicle and is formed on a portion of the block 20 that is offset rearward from the linearly-movable-shaft main body 11. The engagement part 25 is tilted such that it inclines toward the inner side of the vehicle as it extends in the rearward direction.

Figure 10:
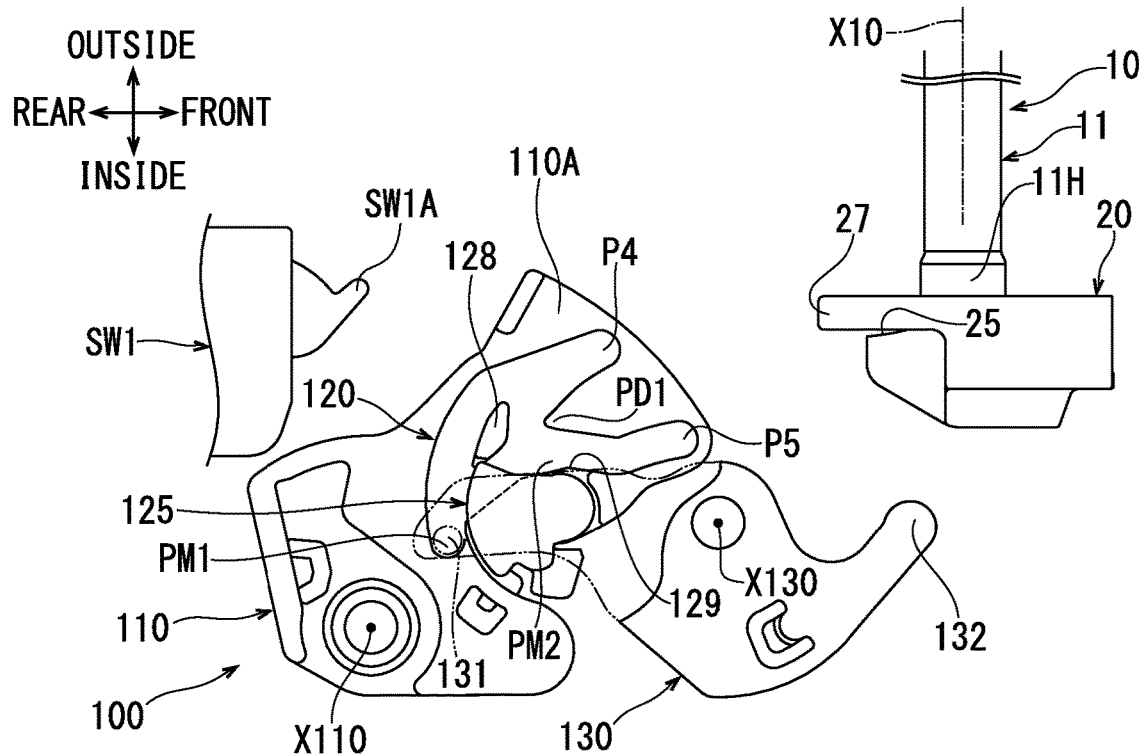
FIG. 10 is a schematic diagram used to describe coordinated movements of the linearly-movable shaft, the first intermittent-guide part, and the first interacting mechanism.

As shown in FIGS. 7, 8, and 10, the actuating part 27 is a protruding part (protrusion) that protrudes rearward from a portion of the block 20 that is offset downward from the linearly-movable-shaft main body 11.

As shown in FIG. 7, the rotary shaft 30 is a polymer (resin) member that extends in a substantially circular-tube shape centered on axial center X10. A helical groove 30J is defined as a recess or slot in an outer-circumferential surface of the rotary shaft 30. The helical groove 30J extends in a helical shape, centered on axial center X10.

A terminal end (tip) of the rotary shaft 30 is an end part located on the lid body 5 side of the rotary shaft 30 in the direction of axial center X10, i.e. toward the outer side of the vehicle, and has a diameter smaller than the other portions of the rotary shaft 30. Latch protrusions 34A, 34B are formed on (at) the terminal end portion (tip) of the rotary shaft 30. The latch protrusions 34A, 34B are substantially plate-shaped protrusions that protrude, from the terminal end portion of the rotary shaft 30, outward in the radial direction of axial center X10 such that they are spaced apart from one other.

As shown in FIGS. 5 and 6, when the linearly-movable-shaft main body 11 is inserted through the rotary shaft 30, the linearly-movable-shaft main body 11 supports the rotary shaft 30 such that it is rotatable around axial center X10. Because the flange part 11F of the linearly-movable-shaft main body 11 and the block 20 sandwich the rotary shaft 30 in the vehicle inside-outside direction, the rotary shaft 30 is kept (blocked) from falling out of the linearly-movable-shaft main body 11. Because the ring-shaped sealing part 83 of the linearly-movable-shaft main body 11 makes annular contact with the interior of the rotary shaft 30, the gap between the linearly-movable-shaft main body 11 and the rotary shaft 30 is sealed, thereby inhibiting (blocking) the ingress of foreign matter into the housing 90 via this gap.

As shown in FIGS. 1-3, the rotary shaft 30 is inserted through the interior of the tubular guide 91A of the housing 90 with the rotary shaft 30 mounted around the linearly-movable shaft 10. Although not shown in the figures, the guide protrusion 91J of the housing 90 projects into the helical groove 30J of the rotary shaft 30.

Because the outer-circumferential surface of the rotary shaft 30 is guided along (via) the guide surface 91G of the tubular guide 91A, the linearly-movable shaft 10 and the rotary shaft 30 are supported by the housing 90 such that they can undergo linear reciprocating motion in the direction of axial center X10.

Furthermore, as was described above, the linearly-movable shaft 10 is supported on the housing 90 by the shaft-shaped guide insertion hole 22 and the shaft-shaped guide 92A such that it can undergo linear reciprocating motion in the direction of axial center X10, but it is nonrotatable about axial center X10.

On the other hand, because the rotary shaft 30 is rotatably supported by the linearly-movable-shaft main body 11 and the guide protrusion 91J that protrudes into the helical groove 30J, the rotary shaft 30 can undergo linear reciprocating motion in the direction of axial center X10 together with the linearly-movable shaft 10 and also the rotary shaft 30 is supported on the housing 90 such that it is rotatable about axial center X10.

Therefore, the linearly-movable shaft 10 is reciprocally moveable in a linear range that includes a first position shown in FIG. 1, a second position shown in FIG. 2, and a third position shown in FIG. 3.

As shown in FIG. 1, the first position of the linearly-movable shaft 10 corresponds to an open position of the lid body 5. When the linearly-movable shaft 10 is disposed in the first position, it protrudes outward from the outermost surface of the vehicle body (i.e. the outermost surface of the body panel 9A). The linearly-movable shaft 10 is also shown in the first position in FIGS. 5, 6, 9A, and 10.

As shown in FIG. 2, the second position of the linearly-movable shaft 10 corresponds to the closed position of the lid body 5. When the linearly-movable shaft 10 is disposed in the second position, it has retracted toward the inner side of the vehicle, with the terminal end (tip) of the linearly-movable shaft 10 entering between the latching flanges 4A, 4B of the lid-body latching part 4. This causes the cushioning part 81 to make contact with the surface of the lid body 5 in the closed position that faces the inner side of the vehicle. The linearly-movable shaft 10 is also shown in the second position in FIGS. 9D, 11, and 13.

As shown in FIG. 3, the third position of the linearly-movable shaft 10 corresponds to the pressed-in position of the lid body 5. When the linearly-movable shaft 10 is disposed in the third position, the cushioning part 81, which is located at the terminal end (tip) of the linearly-movable shaft 10, remains in contact with the surface of the lid body 5 in the pressed-in position that faces the inner side of the vehicle while retracting even deeper toward the inside of the opening 8 than in the second position. The linearly-movable shaft 10 is also shown in the third position in FIGS. 9C, 12, and 14.

The linearly-movable shaft 10 is biased (urged) in the vehicle outward direction by the compression-coil spring 10S shown in FIG. 7 toward the first position shown in FIG. 1.

When the linearly-movable shaft 10 is moved to the second position or the third position, the rotary shaft 30 is simultaneously rotated to the latched position shown in FIGS. 2 and 3 owing to the interaction between the guide protrusion 91J of the housing 90 and the helical groove 30J of the rotary shaft 30. When the rotary shaft 30 is in the latched position, the latch protrusion 34A protrudes forward and latches the latching flange 4A of the lid-body latching part 4, and the latch protrusion 34B protrudes rearward and latches the latching flange 4B of the lid-body latching part 4. Thus, when the rotary shaft 30 is in the latched position, the lid body 5 is latched in the closed position or the pressed-in position. The rotary shaft 30 is also shown in the latched position by solid lines in FIG. 4.

On the other hand, when the linearly-movable shaft 10 is moved to the first position, the rotary shaft 30 is simultaneously rotated to the unlatched position shown in FIG. 1 owing to the interaction between the guide protrusion 91J of the housing 90 and the helical groove 30J of the rotary shaft 30. When the rotary shaft 30 is in the unlatched position, the latch protrusion 34A is caused to protrude upward and be spaced apart from the latching flange 4A of the lid-body latching part 4. Furthermore, although not shown, the latch protrusion 34B is caused to protrude downward and be spaced apart from the latching flange 4B of the lid-body latching part 4. Thus, when the rotary shaft 30 is in the unlatched position, the lid body 5 is no longer latched. The rotary shaft 30 is also shown in the unlatched position by chain double-dashed lines in FIGS. 4-6.

Stopper

As shown in FIGS. 5-7 and 9, the stopper 50 is a polymer (resin) member that includes a pivot-axis part 51, a fan-shaped (arcuate) gear 56, a stopper surface (engagement surface) 55, a manual-operation part (tab) 59, and a spring-seat part 53 that are all integrally formed as a single component, i.e. the stopper 50.

The pivot-axis part 51 is supported by the housing 90 such that the stopper 50 is pivotable around pivot-axis center X50 that extends in the up-down direction.

Gear teeth are formed on the fan-shaped gear 56 and extend along an arc of a fan-shaped portion that protrudes from an upper portion of the pivot-axis part 51 toward the inner side of the vehicle.

The stopper surface 55 is formed on a substantially block-shaped portion that protrudes from a lower portion of the pivot-axis part 51 toward the inner side of the vehicle. The stopper surface 55 is a curved surface that faces the inner side of the vehicle while curving such that it traces an arc centered on pivot-axis center X50.

The manual-operation part 59 is connected to a region shifted upward and rearward of the stopper surface 55 on the substantially block-shaped portion that protrudes from the lower portion of the pivot-axis part 51 toward the inner side of the vehicle. The manual-operation part 59 extends toward the inner side of the vehicle while curving in a crank shape.

As shown in FIG. 4, the terminal end (tip) of the manual-operation part 59 passes through the slot 92H of the housing case 92, protrudes outside of the housing 90, and is covered by the rubber cap 92C as shown in FIG. 1. When the user moves the manual-operation part 59 by pushing on the rubber cap 92C, it becomes possible to manually pivot the stopper 50. That is, the manual-operation part 59 is provided such that it is operable (manually pushable) from the outside of the housing 90.

As shown in FIGS. 5, 6, and 9, the spring-seat part 53 is formed at a position that is spaced apart from the pivot-axis part 51 toward the inner side of the vehicle and rearward. The spring-seat part 53 protrudes toward the outer side of the vehicle. The spring-seat part 53 latches in the end part of the compression-coil spring 50S (FIG. 7) that is on the inner side of the vehicle. The compression-coil spring 50S biases the stopper 50 in the direction of displacing (pivoting) the stopper surface 55 forward.

The stopper 50 is pivotable in a (pivot) range that includes (between) a blocking position shown by solid lines in FIG. 9D and a nonblocking position shown by chain double-dashed lines in FIG. 9D.

When the stopper 50 is in the blocking position shown by solid lines in FIG. 9D, the stopper surface 55 engages (contacts) the engagement part 25 formed on the block 20 of the linearly-movable shaft 10 in the second position, thereby prohibiting (blocking) the linearly-movable shaft 10 from moving from the second position to the first position. The stopper 50 is also shown in the blocking position in FIGS. 5, 6, 9A, and 9C.

When the stopper 50 is in the nonblocking position shown by chain double-dashed lines in FIG. 9D, the stopper surface 55 is separated (spaced apart) from the engagement part 25 formed on the block 20 of the linearly-movable shaft 10 in the second position, thereby permitting the linearly-movable shaft 10 to move from the second position to the first position. The stopper 50 is also shown in the nonblocking position in FIG. 9B.

The stopper 50 is biased toward the blocking position by the compression-coil spring 50S shown in FIG. 7.

Electric Actuator and Switch

As shown in FIGS. 5-7, the electric actuator 60 comprises an electric motor 61 and a worm gear 66, which are housed inside the housing 90. Power supply wiring for the electric motor 61 is routed, via a wire harness W1 shown in FIG. 1, to a power supply circuit of a control part (FIG. 1) installed inside the vehicle, e.g., to an electronic control unit (ECU) or other type of processor/controller. As shown in FIG. 5, the worm gear 66 is connected to a drive shaft of the electric motor 61 so as to be rotatable therewith. The worm gear 66 meshes with the fan-shaped gear 56 of the stopper 50.

As shown in FIG. 6, the switch SW1 is housed within a rear portion of the housing 90 and is disposed downward of the electric motor 61 and the worm gear 66.

Figure 14:
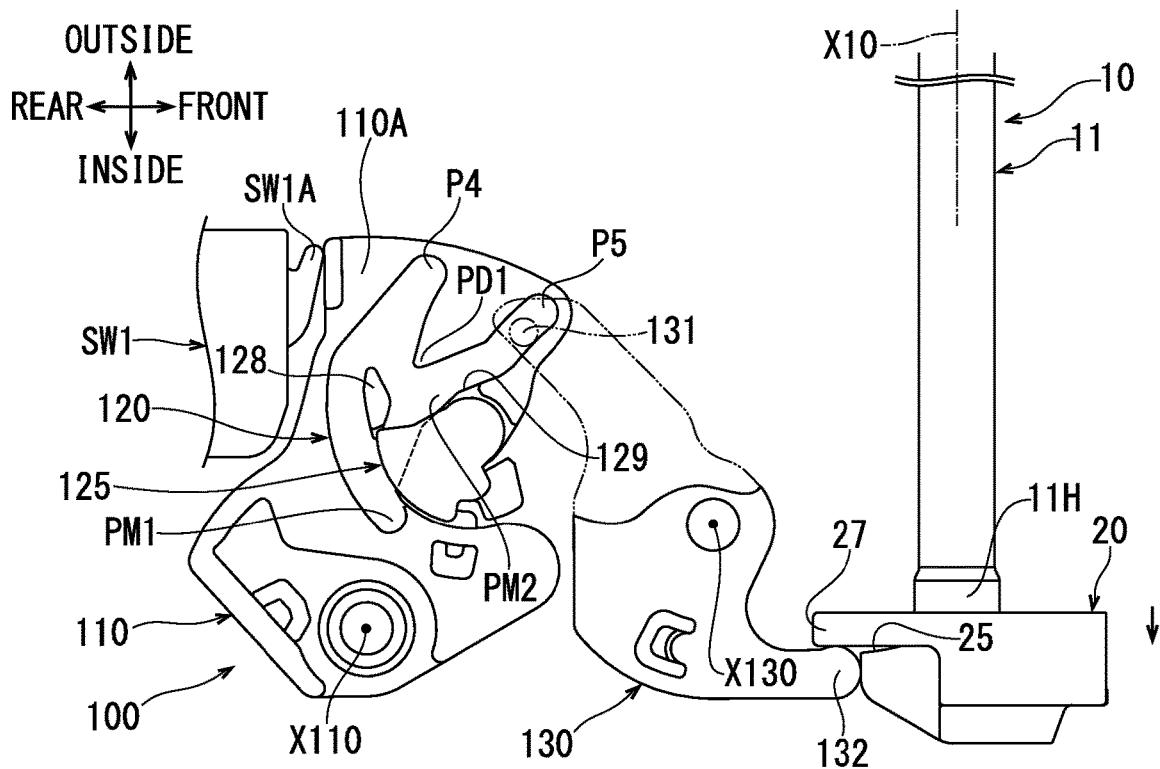
FIG. 14 is a schematic diagram used to describe coordinated movements of the linearly-movable shaft, the first intermittent-guide part, and the first interacting mechanism.

The switch SW1 comprises a movable protrusion (lever) SW1A that is displaceable in the front-rear direction. The switch SW1 is switched to a disconnected state when the movable protrusion SW1A protrudes forward from a front surface of the switch SW1. On the other hand, the switch SW1 is switched to a connected state when the movable protrusion SW1A is displaced from the position shown in FIG. 6 rearward as shown in FIG. 14.

The power supply wiring for the electric motor 61 is wired so as to transit the switch SW1 along the way, i.e. the switch SW1 is arranged in the power supply circuit to the electric motor 61 and thus is adapted/configured to turn the electric motor 61 ON and OFF. Therefore, when the switch SW1 is switched to the connected state, the electric motor 61 is electrically connected to the power supply circuit of the control part and thus is energized. On the other hand, when the switch SW1 is switched to the disconnected state, the electric motor 61 is electrically disconnected from the power supply circuit of the control part and thus is no longer energized.

That is, there is a one-to-one correspondence between the connected state of the switch SW1 and the rotation of the electric motor 61, and a one-to-one correspondence between the disconnected state of the switch SW1 and the halting (stoppage) of the electric motor 61. Consequently, the present circuit design eliminates the need for a complex electrical circuit and/or program for the control part to control the electric motor 61.

When the electric motor 61 is energized in response to the switch SW1 having been switched to the connected state, the electric actuator 60 transmits the driving force (rotation) of the electric motor 61 to the stopper 50 via the worm gear 66 and the fan-shaped gear 56 and pivots the stopper 50, against the biasing force of the compression-coil spring 50S shown in FIG. 7, from the blocking position shown with solid lines in FIG. 9D to the nonblocking position shown with chain double-dashed lines in FIG. 9D.

Then, when the switch SW1 switches to the disconnected state and the electric motor 61 is no longer energized, the holding force will no longer act on the worm gear 66, and therefore the electric actuator 60 will permit the stopper 50 to return to the blocking position owing to the biasing force of the compression-coil spring 50S shown in FIG. 7, as will be further explained below.

Intermittent Mechanism

As shown in FIG. 6, the intermittent mechanism 100 is disposed inside the housing 90 downward of the electric motor 61 and the worm gear 66. The intermittent mechanism 100 comprises a transmitting lever 130 and a first intermittent-guide part 110. The transmitting lever 130 is one non-limiting example of a "first interacting mechanism" according to the present teachings.

As shown in FIGS. 6, 8, and 10-15, the transmitting lever 130 is supported by the housing 90 such that it is pivotable around pivot-axis center X130 extending in the up-down direction. The transmitting lever 130 is a polymer (resin) member, in which a driven part 132 and a first guided part 131 are integrally molded.

The driven part 132 is a protrusion that protrudes toward the outside of the vehicle and forward at a position separated (spaced apart) forward from pivot-axis center X130. The tip of the driven part 132 is rounded in a semicircular-arc shape.

As shown in FIG. 8, the first guided part 131 is a circular-cylindrical shaft that protrudes upward at a position separated (spaced apart) rearward from pivot-axis center X130.

The transmitting lever 130 is biased by a torsion coil spring 130S (see FIG. 8) in the counterclockwise direction around pivot-axis center X130 in the plane of the paper of FIGS. 6 and 10-15.

When the linearly-movable shaft 10 is disposed in the first position shown in FIG. 10, the actuating part 27 of the linearly-movable shaft 10 is most separated (spaced apart) from the driven part 132 of the transmitting lever 130.

Figure 11:
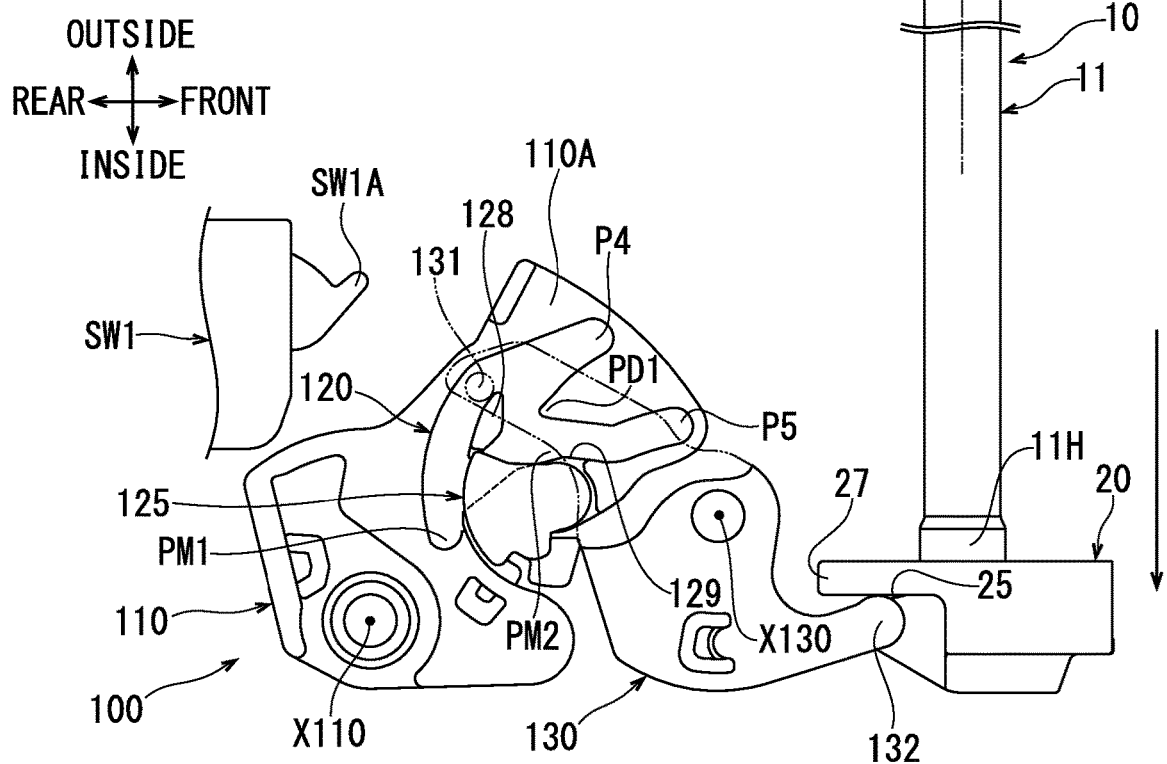
FIG. 11 is a schematic diagram used to describe coordinated movements of the linearly-movable shaft, the first intermittent-guide part, and the first interacting mechanism.

As the linearly-movable shaft 10 displaces from the first position shown in FIG. 10 toward the second position shown in FIG. 11, the actuating part 27 approaches the driven part 132 and eventually makes contact with the driven part 132. Then, the torsion coil spring 130S biases the transmitting lever 130 such that the driven part 132 is pressed against the actuating part 27. Thereby, the driven part 132 of the transmitting lever 130 engages with the actuating part 27 of the linearly-movable shaft 10, and the transmitting lever 130 interacts with the linearly-movable shaft 10.

Figure 12:
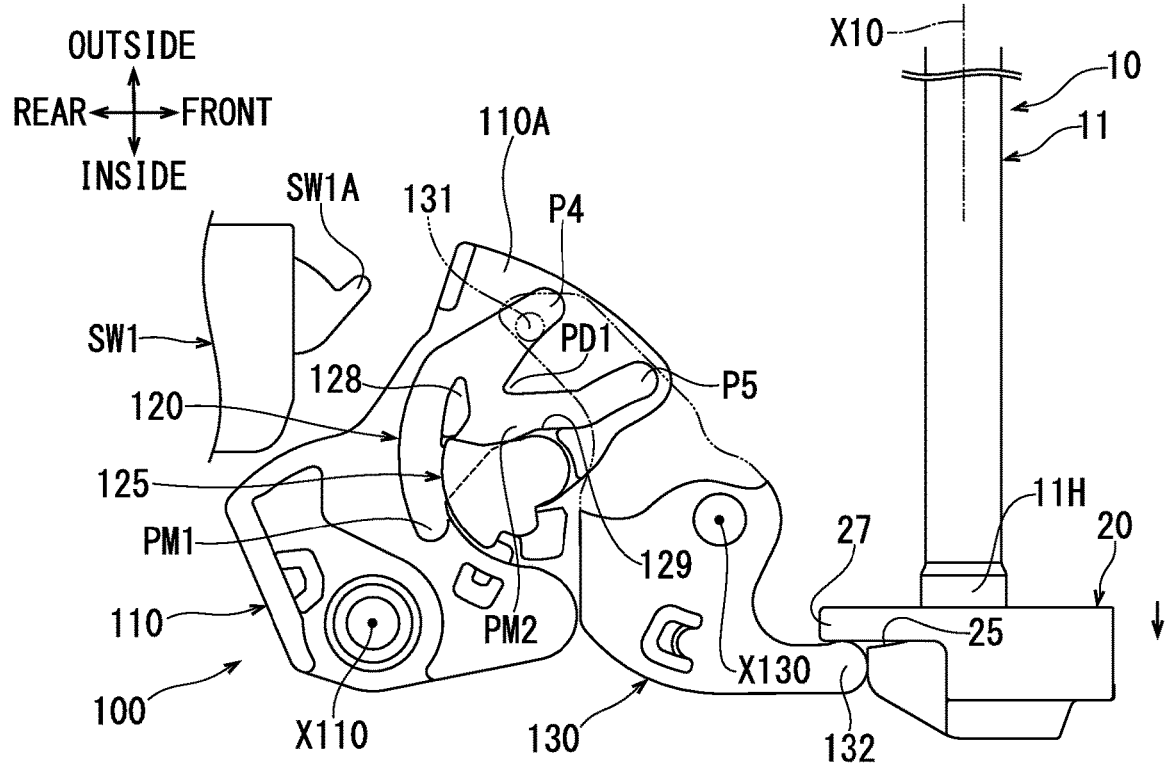
FIG. 12 is a schematic diagram used to describe coordinated movements of the linearly-movable shaft, the first intermittent-guide part, and the first interacting mechanism.

Then, when the linearly-movable shaft 10 passes the second position shown in FIG. 11 and displaces toward the third position shown in FIG. 12, the linearly-movable shaft 10 causes the transmitting lever 130 to pivot clockwise in FIG. 12 against the biasing force of the torsion coil spring 130S.

Therefore, as the linearly-movable shaft 10 approaches and then reaches the third position shown in FIG. 12 from the first position shown in FIG. 10, the transmitting lever 130 displaces the first guided part 131 toward the outside of the vehicle and forward around pivot-axis center X130.

On the other hand, when the linearly-movable shaft 10 displaces from the third position shown in FIG. 14 to the first position shown in FIG. 10, the linearly-movable shaft 10 permits the transmitting lever 130 to be pivoted by the biasing force of the torsion coil spring 130S in the counterclockwise direction of FIG. 10. Then, when the linearly-movable shaft 10 has passed the second position, the actuating part 27 separates from the driven part 132. As a result, the driven part 132 of the transmitting lever 130 no longer engages with the actuating part 27 of the linearly-movable shaft 10, and the transmitting lever 130 no longer interacts with the linearly-movable shaft 10.

Thus, as the linearly-movable shaft 10 approaches and then reaches the first position shown in FIG. 10 from the third position shown in FIG. 14, the transmitting lever 130 displaces the first guided part 131 toward the inside of the vehicle and backward around pivot-axis center X130.

As shown in FIGS. 6, 8, and 10-15, the first intermittent-guide part 110 is supported by the housing 90 so as to be pivotable around pivot-axis center X110 that extends in the up-down direction at a position that is separated (spaced apart) from the pivot-axis center X130 toward the inner side of the vehicle and rearward. The first intermittent-guide part 110 is a polymer (resin) member having a first intermittent profile 120.

The first intermittent-guide part 110 comprises a guide-part main body 110A that extends toward the outside of the vehicle and forward from pivot-axis center X110. As the first intermittent-guide part 110 pivots around pivot-axis center X110, the guide-part main body 110A displaces between a first position that is separated (spaced apart) from the movable protrusion SW1A of the switch SW1 in the direction toward pivot-axis center X130, as shown in FIGS. 6, 10-13, and 15, and a second position at which the movable protrusion SW1A of the switch SW1 is pressed rearward, thereby causing the switch SW1 to be placed (set) into the connected state, as shown in FIG. 14.

The first intermittent-guide part 110 is biased by a torsion coil spring 110S (see FIG. 8) in the counterclockwise direction in the plane of the paper in FIGS. 6 and 10-15 around pivot-axis center X110, so as to move away from pivot-axis center X130 toward the movable protrusion SW1A of the switch SW1.

As shown in FIGS. 8 and 10, the first intermittent profile 120 is formed in the first intermittent-guide part 110 in order to guide the movement of the first guided part 131 of the transmitting lever 130 when the transmitting lever 130 is being pivoted by the linearly-movable shaft 10 or the torsion spring 130S. The first intermittent profile 120 is a groove recessed upward from the bottom surface of the guide-part main body 110A.

The first intermittent profile 120 includes fourth position P4, fifth position P5, maximum separation position PM1, and intermediate stopping position PM2.

Fourth position P4 and fifth position P5 are, respectively, substantially cul-de-sac-shaped on the side of the end that is farthest away from pivot-axis center X110 in the guide-part main body 110A. Fourth position P4 is separated (spaced apart) more from pivot-axis center X130 of the transmitting lever 130 than is fifth position P5. In other words, fourth position P4 is at a position closer to the switch SW1 than is fifth position P5.

The first intermittent-guide part 110 is biased by the torsion coil spring 110S so as to displace in a direction in which fourth position P4 and fifth position P5 of the first intermittent profile 120 separate (move away) from pivot-axis center X130 of the transmitting lever 130 toward the switch SW1 side.

Maximum separation position PM1 is substantially cul-de-sac-shaped on the side of pivot-axis center X110 of the guide-part main body 110A. Maximum separation position PM1 is the position most separated (spaced apart) from fourth position P4 and fifth position P5 on the side of pivot-axis center X110.

Intermediate stopping position PM2 is positioned between maximum separation position PM1 and a range that includes fourth position P4 and fifth position P5.

When the transmitting lever 130 interacts with the linear reciprocal motion of the linearly-movable shaft 10, the first intermittent profile 120 causes the first guided part 131 of the transmitting lever 130 to cycle around these positions in order, i.e. from maximum separation position PM1, to fourth position P4, to intermediate stopping position PM2, to fifth position P5 and then back again to maximum separation position PM1.

In other words, as shown in FIG. 10, when the linearly-movable shaft 10 is in the first position, the first guided part 131 is disposed in (at) maximum separation position PM1.

Then, as the linearly-movable shaft 10 displaces from the first position shown in FIG. 10 to the third position shown in FIG. 12, passing through the second position shown in FIG. 11, the first guided part 131 displaces from maximum separation position PM1 (FIG. 10) to fourth position P4 (FIG. 12).

Figure 13:
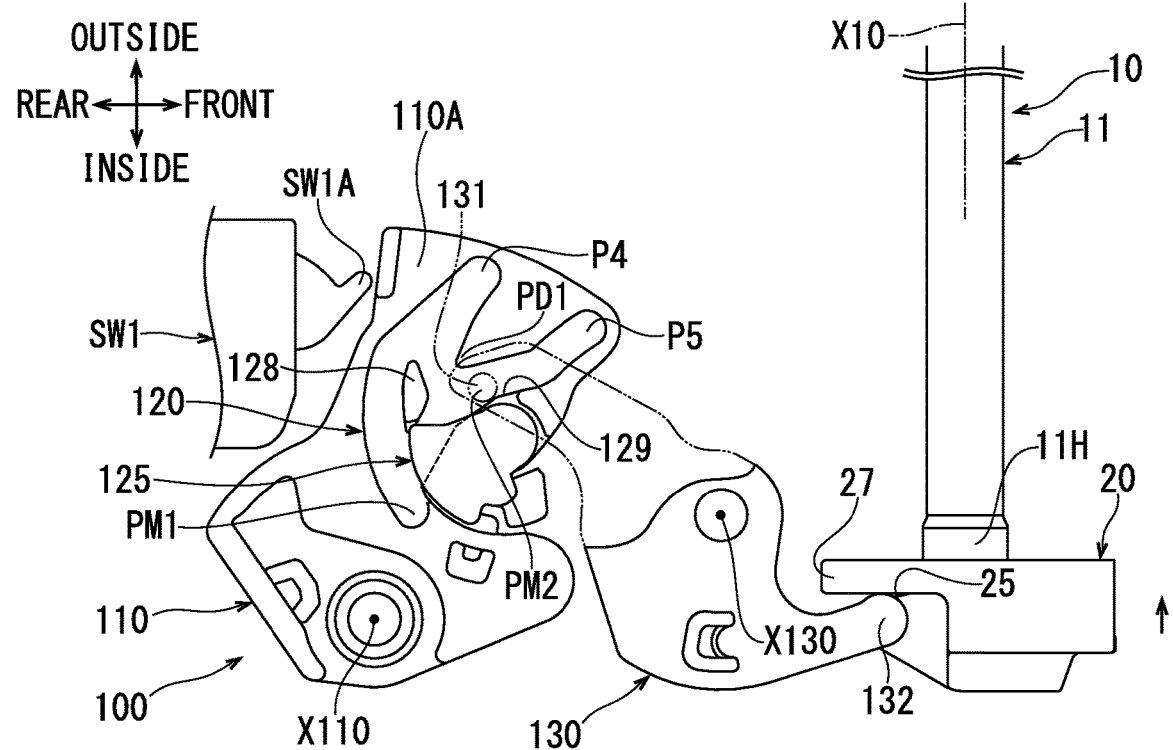
FIG. 13 is a schematic diagram used to describe coordinated movements of the linearly-movable shaft, the first intermittent-guide part, and the first interacting mechanism.

Then, as the linearly-movable shaft 10 displaces from the third position shown in FIG. 12 to the second position shown in FIG. 13, the first guided part 131 displaces from fourth position P4 (FIG. 12) to intermediate stopping position PM2 (FIG. 13).

Then, as the linearly-movable shaft 10 displaces from the second position shown in FIG. 13 to the third position shown in FIG. 14, the first guided part 131 displaces from intermediate stopping position PM2 (FIG. 13) to fifth position P5 (FIG. 14).

Finally, as the linearly-movable shaft 10 displaces from the third position shown in FIG. 14 back to the first position shown in FIG. 10, the first guided part 131 displaces from fifth position P5 (FIG. 14) to maximum separation position PM1 (FIG. 10).

As shown in FIGS. 8 and 10, to cause the first guided part 131 to reliably cycle around, in order, the positions of maximum separation position PM1, fourth position P4, intermediate stopping position PM2, and fifth position P5, a restricting part 128 and a guide wall 129 are formed on the first intermittent profile 120, and a reverse-motion preventing member 125 is also provided.

The restricting part 128 is formed substantially island-shaped in the center of the first intermittent profile 120 and is disposed between maximum separation position PM1 and fourth position P4. The restricting part 128 protrudes toward fourth position P4 at a position that is offset from a branching apex part PD1, where fourth position P4 and fifth position P5 branch, toward fourth position P4.

As the first guided part 131 is being guided from maximum separation position PM1 shown in FIG. 10 to fourth position P4 shown in FIG. 12, the restricting part 128 makes contact with the first guided part 131, as shown in FIG. 11, and restricts (blocks) the first guided part 131 from changing its path toward intermediate stopping position PM2.

As shown in FIGS. 8 and 10, the guide wall 129 extends from fifth position P5 to maximum separation position PM1 while facing the branching apex part PD1 and the restricting part 128 with a gap therebetween.

While being guided from fourth position P4 shown in FIG. 12 to intermediate stopping position PM2 shown in FIG. 13 and passing between the branching apex part PD1 and the restricting part 128, the first guided part 131 is pressed against the guide wall 129, upon which the biasing force of the torsion coil spring 110S acts, and is thus held at intermediate stopping position PM2.

As shown in FIG. 8, the reverse-motion preventing member 125 is pivotably supported by a shaft hole 110H that passes through the guide-part main body 110A on the side opposite the restricting part 128 with the guide wall 129 interposed therebetween. The reverse-motion preventing member 125 is biased by a torsion coil spring 125S in the clockwise direction in the plane of the paper of FIGS. 6 and 10-15 such that it protrudes between the restricting part 128 and the guide wall 129.

Figure 15:
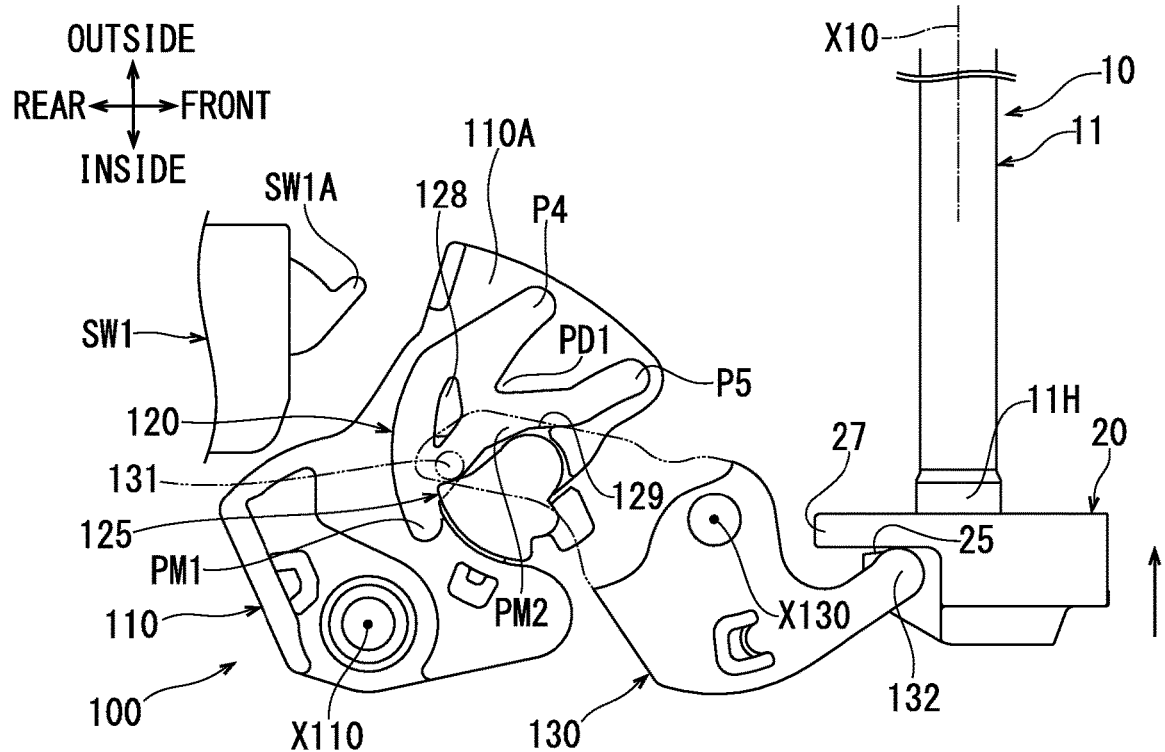
FIG. 15 is a schematic diagram used to describe coordinated movements of the linearly-movable shaft, the first intermittent-guide part, and the first interacting mechanism.

As the first guided part 131 is being guided from fifth position P5 shown in FIG. 14 to maximum separation position PM1 shown in FIG. 10, the reverse-motion preventing member 125 is pressed against the first guided part 131 and pivots against the biasing force of the torsion coil spring 125S so as to open a space between the restricting part 128 and the guide wall 129, as shown in FIG. 15, thus permitting the passage of the first guided part 131 between the restricting part 128 and the guide wall 129.

On the other hand, when the reverse-motion preventing member 125 is not pivoting despite being pressed against the first guided part 131 as the first guided part 131 is being guided from maximum separation position PM1 shown in FIG. 10 to fourth position P4 shown in FIG. 12, reverse motion of the first guided part 131 is restricted (blocked).

In this manner, the first intermittent-guide part 110 alternately guides the first guided part 131 between fourth position P4 and fifth position P5 while the linearly-movable shaft 10 pivots during the action of repeatedly moving to the third position, and, when the first guided part 131 is guided to fifth position P5, presses the movable protrusion SW1A and switches the switch SW1 to the connected state.

Lid-Body Opening/Closing Actions

The linear reciprocating-motion apparatus 1 having the above-described configuration opens and closes the lid body 5 as described below. The following explanation will begin starting from the state in which the lid body 5 is in the open position, where the opening 8 is open, as shown by the chain double-dashed lines in FIG. 1.

In this state, as shown in FIG. 1, the linearly-movable shaft 10 is in the first position, the first guided part 131 is in (at) maximum separation position PM1 shown in FIG. 10, and the guide-part main body 110A is spaced apart from the movable protrusion SW1A of the switch SW1, with the switch SW1 in the disconnected state.

If the user then pushes in the lid body 5 shown by chain double-dashed lines in FIG. 1 toward the inner side of the vehicle to the state (position) indicated by solid lines in FIG. 1, then the terminal end (tip) of the linearly-movable shaft 10 in the first position and the terminal end (tip) of the rotary shaft 30 in the unlatched position enter into the lid-body latching part 4 of the lid body 5, and the cushioning part 81 of the linearly-movable shaft 10 makes contact with the surface of the lid body 5 that faces the inner side of the vehicle, thus absorbing the impact.

If the user then further pushes the lid body 5 against the biasing force of the compression-coil spring 10S toward the inner side of the vehicle, the lid body 5 will pass the closed position shown in FIG. 2 and reach the pressed-in position shown in FIG. 3. At this time, the linearly-movable shaft 10 passes the second position and reaches the third position. The rotary shaft 30 moves linearly together with the linearly-movable shaft 10 while rotating from the unlatched position to the latched position, thus latching the latch protrusions 34A, 34B to the lid-body latching part 4 and thereby latching the lid body 5.

In addition, at this time, as shown in FIG. 9B, the stopper 50 is pushed in the rearward direction by a rear-end surface of the block 20 of the linearly-movable shaft 10 and thereby pivots from the blocking position to the nonblocking position against the biasing force of the compression-coil spring 50S. Therefore, the linearly-movable shaft 10 is permitted to pass through the second position to the third position.

Then, as shown in FIG. 9C, when the linearly-movable shaft 10 has passed the second position and approaches the third position, the stopper 50 is pivoted back to the blocking position by the biasing force of the compression-coil spring 50S. At this time, the stopper surface 55 opposes, from the outer side of the vehicle, the engagement part 25 of the linearly-movable shaft 10, with a gap between them as shown in FIG. 9C.

Thereafter, when the user takes their hand off the lid body 5, the linearly-movable shaft 10 displaces from the third position back to the second position owing to the biasing force of the compression-coil spring 10S as shown in solid lines in FIG. 9D. Then, because the stopper surface 55 of the stopper 50 is disposed in the blocking position where it engages with (blocks movement of) the engagement part 25 of the linearly-movable shaft 10, the linearly-movable shaft 10 is held at the second position. As a result, the lid body 5 is held at the closed position shown in FIG. 2.

If the user performs the manual closing operation of closing the lid body 5 as described above and subsequently takes their hand off the lid body 5, then the first guided part 131 displaces from maximum separation position PM1 shown in FIG. 10 to fourth position P4 shown in FIG. 12 and then displaces from fourth position P4 to intermediate stopping position PM2 shown in FIG. 13. During this period, too, the guide-part main body 110A is spaced apart from the movable protrusion SW1A of the switch SW1, so that the switch SW1 is (remains) in the disconnected state. For this reason, the electric motor 61 of the electric actuator 60 is not energized.

To pivot the lid body 5 held at the closed position shown in FIG. 2 to the open position shown in FIG. 1, the user performs a manual opening operation by pressing in the lid body 5 from the closed position to the pressed-in position shown in FIG. 3. That is, the specific operation for moving the linearly-movable shaft 10 to the first position is performed. Thereby, as shown in FIG. 9C, the linearly-movable shaft 10 moves from the second position and reaches the third position while the stopper 50 remains in the blocking position.

At this time, the first guided part 131 displaces from intermediate stopping position PM2 shown in FIG. 13 to fifth position P5 shown in FIG. 14, and the guide-part main body 110A presses the movable protrusion SW1A of the switch SW1, thereby causing the switch SW1 to switch to the connected state. For this reason, the electric motor 61 of the electric actuator 60 is energized and causes the stopper 50 to pivot to the nonblocking position shown by chain double-dashed lines in FIG. 9D.

That is, in response to the manual opening operation for displacing the lid body 5 to the open position, i.e. the specific operation, the electric actuator 60 is energized, and the stopper 50 is displaced to the nonblocking position. In addition, the intermittent mechanism 100 is put into a specific state once out of every two times the linearly-movable shaft 10 repeats the operation of moving (movement) to the third position, that is, into the state in which the first intermittent profile 120 of the first intermittent-guide part 110 guides the first guided part 131 to fifth position P5. Then, the switch SW1 switches from the disconnected state to the connected state when the specific state has been achieved.

When the stopper 50 has been pivoted to the nonblocking position (as shown by chain double-dashed lines in FIG. 9D) such that the stopper surface 55 of the stopper 50 is separated (spaced apart) from the engagement part 25 of the linearly-movable shaft 10, the linearly-movable shaft 10 is permitted to pass the second position and displaces to the first position shown in FIG. 9A owing to the biasing force of the compression spring 10S. Consequently, the lid body 5 passes the closed position shown in FIG. 2 and pivots to the open position shown by solid lines in FIG. 1.

At this time, the rotary shaft 30 rotates from the latched position shown in FIG. 2 to the unlatched position shown in FIG. 1 while moving linearly together with the linearly-movable shaft 10. The rotation of the rotary shaft 30 causes the latch protrusions 34A, 34B to separate from the lid-body latching part 4, and thereby the lid body 5 is no longer latched. As a result, the user can pivot the lid body 5 farther to the open position shown by chain double-dashed lines in FIG. 1.

During this time period, the first guided part 131 displaces from fifth position P5 shown in FIG. 14 to maximum separation position PM1 shown in FIG. 10, passing the reverse-motion preventing member 125 shown in FIG. 15, and the guide-part main body 110A separates from the movable protrusion SW1A of the switch SW1, thereby causing the switch SW1 to switch to the disconnected state. For this reason, the energizing of the electric motor 61 halts and the stopper 50 returns to the blocking position due to the biasing force of the compression-coil spring 50S.

It is noted that, in the event that the electric actuator 60 does not operate, for example during repair work or at the time of an anomaly, such as when the battery is disconnected or completely discharged, there are situations in which the user must pivot the lid body 5 held at the closed position shown in FIG. 2 to the open position shown in FIG. 1. In these situations, the user may press the manual-operation part 59 rearward to manually pivot the stopper 50 from the blocking position to the nonblocking position, and thereby the lid body 5 is pivotable to the open position shown in FIG. 1.

Functions and Effects

With the linear reciprocating-motion apparatus 1 of Working Example 1 as shown in FIGS. 1-3, to repeatedly perform the action of moving the linearly-movable shaft 10 to the third position, the manual closing operation (in which the user presses in the lid body 5 from the open position to the pressed-in position in order to hold the lid body 5 at the closed position) and the manual opening operation (in which the user presses in the lid body 5 from the closed position to the pressed-in position in order to displace the lid body 5 to the open position) are performed alternately.

As was noted above, the linear reciprocating-motion apparatus 1 includes the intermittent mechanism 100 configured as described above and as shown in FIGS. 10-15. Therefore, when the action of the linearly-movable shaft 10 moving to the third position is repeated, once every two times the guide-part main body 110A presses the movable protrusion SW1A to cause the switch SW1 to switch from the disconnected state to the connected state as shown in FIG. 14, because the first guided part 131 of the transmitting lever 130 is alternately guided to fourth position P4 or fifth position P5 of the first intermittent profile 120 and only when guided toward fifth position P5, the guide-part main body 110A presses the movable protrusion SW1A.

By utilizing such intermittent switching of the switch SW1, when the user performs the manual closing operation to close the lid body 5, the electric actuator 60 is not energized and it is not necessary to utilize complex electrical circuitry for the control part to control the electric motor 61. On the other hand, when the user performs the manual opening operation to open the lid body 5, the electric actuator 60 is energized and the stopper 50 is displaced to the nonblocking position. That is, because mechanical control is used in the above-described linear reciprocating-motion apparatus 1, the occurrence (possibility) of malfunctions caused by a bug in an electronic control program can be reduced.

Accordingly, the linear reciprocating-motion apparatus 1 according to Working Example 1 makes it possible to simplify the electrical circuitry for the switch SW1 and to further increase reliability.

In addition, because the intermittent mechanism 100 of the linear reciprocating-motion apparatus 1 comprises the first intermittent-guide part 110 and the transmitting lever 130 configured as described above, it is possible to reliably switch the switch SW1 from the disconnected state to the connected state once out of every two times that the lid body 5 is pressed to the pressed-in position.

Furthermore, in this linear reciprocating-motion apparatus 1, the first intermittent-guide part 110 is biased such that fourth position P4 and fifth position P5 of the first intermittent profile 120 displace in a direction (leading) away from the transmitting lever 130, and fourth position P4 is spaced apart from pivot-axis center X130 of the transmitting lever 130 more than fifth position P5. Therefore, the first guided part 131 cycles (moves) around the positions of maximum separation position PM1, fourth position P4, intermediate stopping position PM2, and fifth position P5 in that order. Furthermore, the restricting part 128 is disposed between maximum separation position PM1 and fourth position P4 and restricts (blocks) a change in path of the first guided part 131 toward intermediate stopping position PM2 as the first guided part 131 is being guided from maximum separation position PM1 to fourth position P4.

In the above-described linear reciprocating-motion apparatus 1, after the first guided part 131 has been guided to fifth position P5 and it is time to be guided to fourth position P4 by the next movement of the linearly-movable shaft 10 to the third position, there are situations in which: (i) the linearly-movable shaft 10 moves at a slow speed from the first position shown in FIG. 10, passes the second position shown in FIG. 11, and moves to the third position shown in FIG. 12; (ii) the linearly-movable shaft 10 moves from the first position shown in FIG. 10, passes the second position shown in FIG. 11, immediately thereafter halts and is held at the second position, and thereafter moves from the second position to the third position; or the like. In these situations, if the restricting part 128 was not (hypothetically) provided in linear reciprocating-motion apparatus 1, when the linearly-movable shaft 10 passes the second position, the first intermittent-guide part 110 would (owing to the biasing force of the torsion coil spring 110S) displace (in an undesired manner) in the direction that fourth position P4 and fifth position P5 of the first intermittent profile 120 are separated from the transmitting lever 130. Therefore, there is a risk that a problem will occur in which the first guided part 131 skips the turn of fourth position P4 and is adversely guided to fifth position P5 via intermediate stopping position PM2. However, because the restricting part 128 of the linear reciprocating-motion apparatus 1 restricts (blocks) the first guided part 131 from changing its path, such a problem can be prevented with high reliability.

In addition, with this linear reciprocating-motion apparatus 1, as shown in FIG. 13, when the first guided part 131 is guided to intermediate stopping position PM2, it is pressed against the guide wall 129 of the first intermittent profile 120 and therefore is held at intermediate stopping position PM2. By virtue of this configuration, the guide wall 129, whose strength can be easily increased, reliably receives (support) the first guided part 131 as it is being guided to intermediate stopping position PM2; therefore, not only can the first guided part 131 be reliably held at intermediate stopping position PM2, but damage to the first intermittent-guide part 110 can be avoided or minimized.

In addition, because this linear reciprocating-motion apparatus 1 includes the stopper 50 that is displaced to the nonblocking position by the electric actuator 60, which is energized only when the first guided part 131 is guided to fifth position P5 in response to the manual opening operation, the manual opening operation performed by the user can be simplified to the action of simply pressing in the lid body 5 to the pressed-in position, and therefore the holding (latching) of the lid body 5 can be easily released.

In addition, with this linear reciprocating-motion apparatus 1, the lid body 5 can be suitably opened/closed owing to the configuration that comprises the linearly-movable shaft 10 and the rotary shaft 30.

Working Example 2

Figure 16:
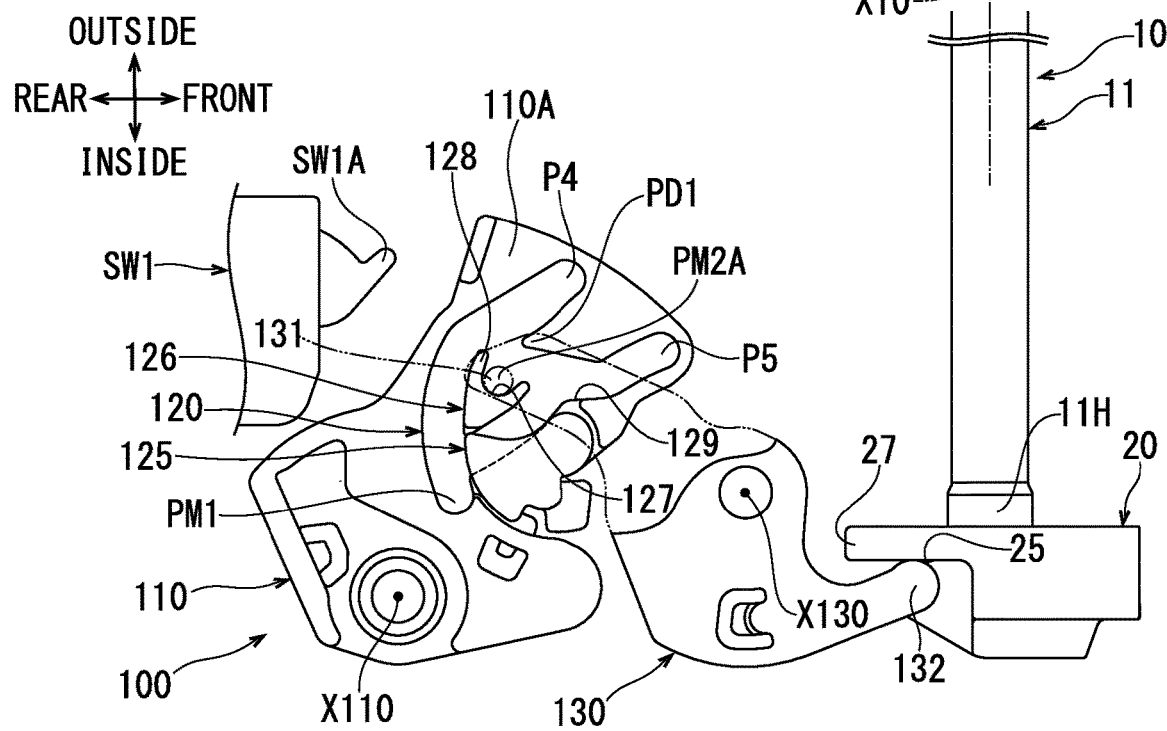
FIG. 16 is a schematic diagram of the linear reciprocating-motion apparatus of Working Example 2, which is used to describe coordinated movements of the linearly-movable shaft, the first intermittent-guide part, and the first interacting mechanism, and illustrates the state in which a first guided part is held at an intermediate stopping position by a recessed part of an island part.

As shown in FIG. 16, in the linear reciprocating-motion apparatus of Working Example 2, an island part 126 is formed in the center of the first intermittent profile 120. The island part 126 includes the restricting part 128 of the first intermittent profile 120 according to the linear reciprocating-motion apparatus 1 of Working Example 1 and a recessed part 127 that is recessed toward maximum separation position PM1 on the fifth position P5 side of the restricting part 128. Furthermore, in Working Example 2, intermediate stopping position PM2 of Working Example 1 is changed to intermediate stopping position PM2A.

The first guided part 131 is held at intermediate stopping position PM2A by entering the recessed part 127 of the island part 126 when being guided to intermediate stopping position PM2A.

Other structural members of Working Example 2 are the same as those of Working Example 1. For this reason, structural members that are identical to those in Working Example 1 are assigned the same reference numerals, and explanation thereof is omitted or abbreviated.

With the linear reciprocating-motion apparatus of Working Example 2 having such a configuration, in the same manner as the linear reciprocating-motion apparatus 1 of Working Example 1, the electrical circuitry for the switch SW1 can be simplified and further improvements in reliability can be achieved.

In addition, with this linear reciprocating-motion apparatus, the recessed part 127 of the island part 126 can reliably receive (support) the first guided part 131 as it is being guided to intermediate stopping position PM2A, and therefore the first guided part 131 can be reliably held at intermediate stopping position PM2A.

Working Example 3

As shown in FIGS. 17-21, the linear reciprocating-motion apparatus of Working Example 3 includes an intermittent mechanism 200 that differs from the intermittent mechanism 100 of the linear reciprocating-motion apparatus 1 of Working Example 1. Other structural members of Working Example 3 are the same as those of Working Example 1. For this reason, structural members that are identical to those in Working Example 1 are assigned the same reference numerals, and explanation thereof is omitted or abbreviated.

Intermittent Mechanism 200

The intermittent mechanism 200 comprises a second intermittent-guide part 210, a transmitting lever 230, and a transmitting rod 231. The transmitting lever 230 and the transmitting rod 231 are a representative, non-limiting example of a "second interacting mechanism" of the present teachings.

As shown in FIGS. 17 and 19-21, the transmitting lever 230 is supported on the housing 90 such that it is pivotable around pivot-axis center X230 that extends in the up-down direction. The transmitting lever 230 is a polymer (resin) member that is formed integrally with a driven part 233. The driven part 233 is a protruding part formed at a position separated (spaced apart) forward from pivot-axis center X230.

The transmitting lever 230 is biased by a torsion coil spring (not shown) in the counterclockwise direction in the plane of the paper of FIGS. 17 and 19-21 around pivot-axis center X230.

The transmitting rod 231 is a rod-shaped body extending in the vehicle inside-outside direction. The end part of the transmitting rod 231 on the inner side of the vehicle is linked to a rear-end part of the transmitting lever 230. The end part of the transmitting rod 231 on the outer side of the vehicle is bent and protrudes upward, and the portion that protrudes upward thereof is called a second guided part 232.

Figure 17:
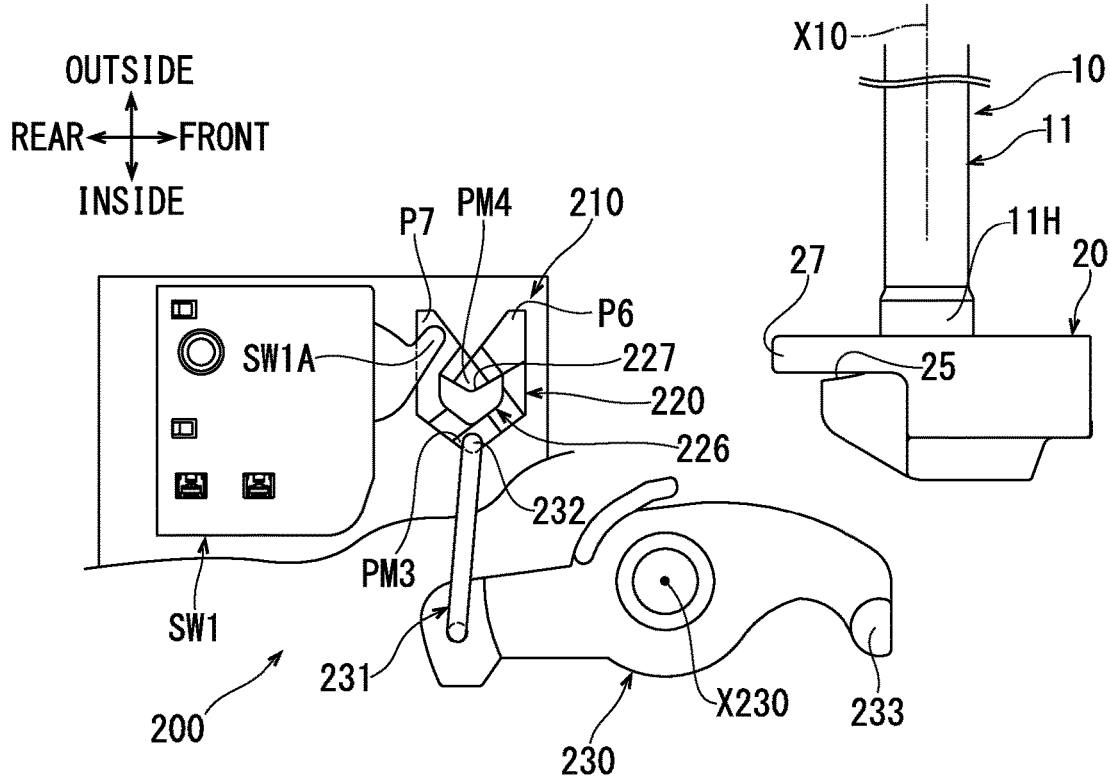
FIG. 17 is a schematic diagram of the linear reciprocating-motion apparatus of Working Example 3, which is used to describe coordinated movements of the linearly-movable shaft, a second intermittent-guide part, and a second interacting mechanism.

When the linearly-movable shaft 10 is disposed in the first position shown in FIG. 17, the actuating part 27 of the linearly-movable shaft 10 is most separated (spaced apart) from the driven part 233 of the transmitting lever 230.

Figure 19:
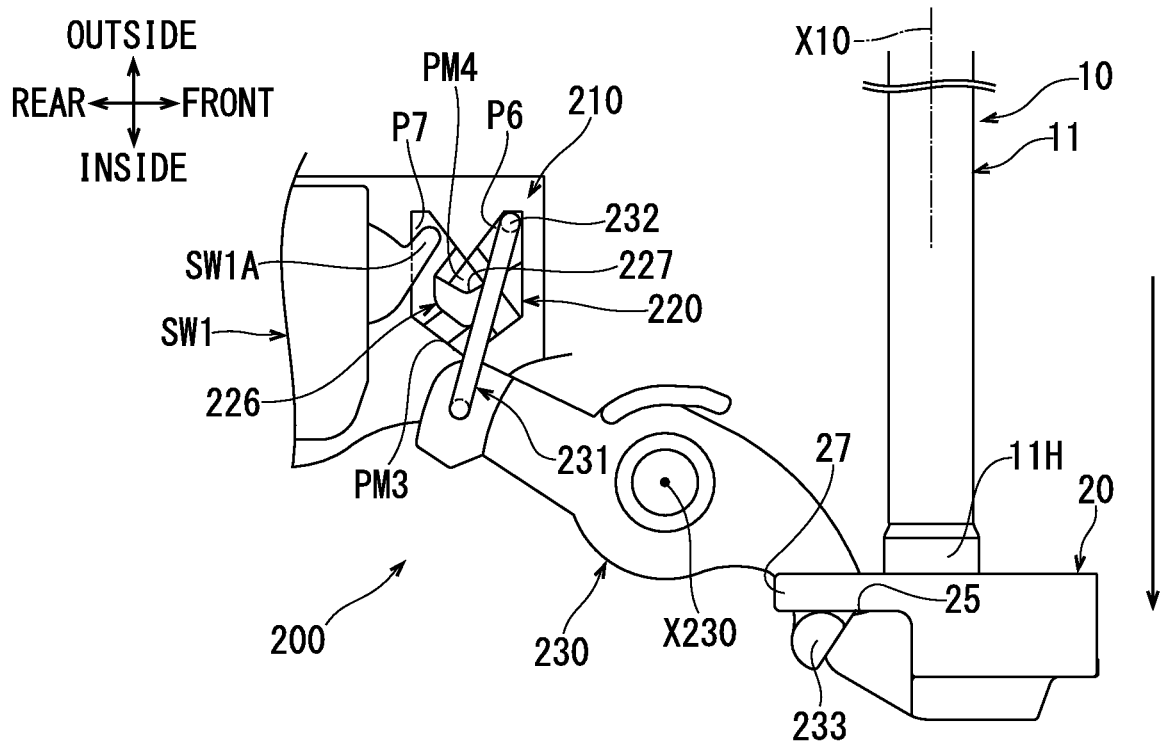
FIG. 19 is a schematic diagram used to describe coordinated movements of the linearly-movable shaft, the second intermittent-guide part, and the second interacting mechanism.

Then, as the linearly-movable shaft 10 displaces from the first position shown in FIG. 17 toward the third position shown in FIG. 19, the driven part 233 is pressed, starting from a point along the way, against the actuating part 27, and thereby the transmitting lever 230 engages (becomes operably engaged) with the linearly-movable shaft 10. Therefore, after this engaging, as the linearly-movable shaft 10 moves toward the third position, the transmitting lever 230 interacts with the linearly-movable shaft 10, and pivots (rotates) in the clockwise direction of FIG. 19 against the biasing force of a torsion coil spring (not shown).

Thereafter, as the linearly-movable shaft 10 approaches and then reaches the third position, the transmitting lever 230 causes the second guided part 232 of the transmitting rod 231 to displace toward the outer side of the vehicle.

Figure 21:
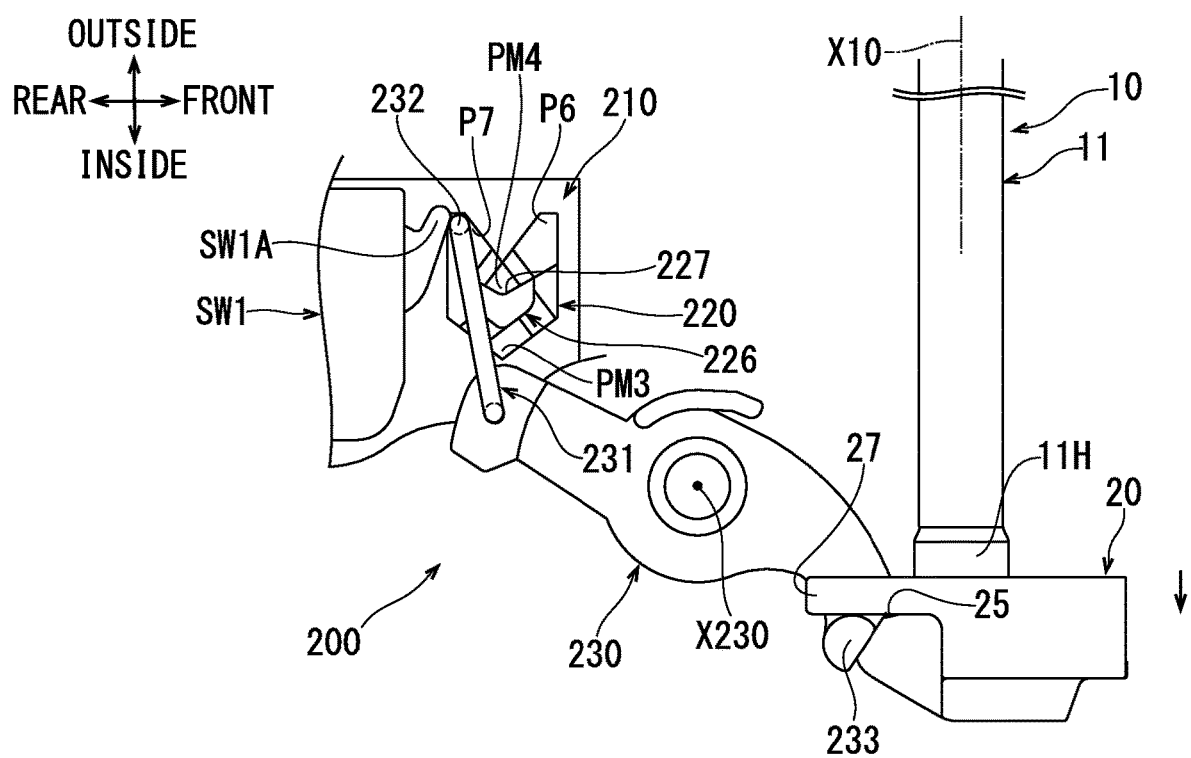
FIG. 21 is a schematic diagram used to describe coordinated movements of the linearly-movable shaft, the second intermittent-guide part, and the second interacting mechanism.

On the other hand, as the linearly-movable shaft 10 displaces from the third position shown in FIG. 21 to the first position shown in FIG. 17, the interaction (engaging) of the transmitting lever 230 with the linearly-movable shaft 10 causes the transmitting lever 230 to pivot (rotate) in the counterclockwise direction of FIG. 17 due to the biasing force of a torsion coil spring (not shown). Thereafter, the driven part 233 separates from the actuating part 27 of the linearly-movable shaft 10.

Then, as the linearly-movable shaft 10 approaches and then reaches the first position, the transmitting lever 230 causes the second guided part 232 of the transmitting rod 231 to displace toward the inner side of the vehicle.

Because the second guided part 232 of the transmitting rod 231 is guided by a (below described) second intermittent profile 220, the second guided part 232 is displaceable between a position spaced apart from the movable protrusion SW1A of the switch SW1 as shown in FIGS. 17-20, and a position at which it presses the movable protrusion SW1A of the switch SW1 rearward and puts the switch SW1 into the connected state, as shown in FIG. 21.

Figure 18:
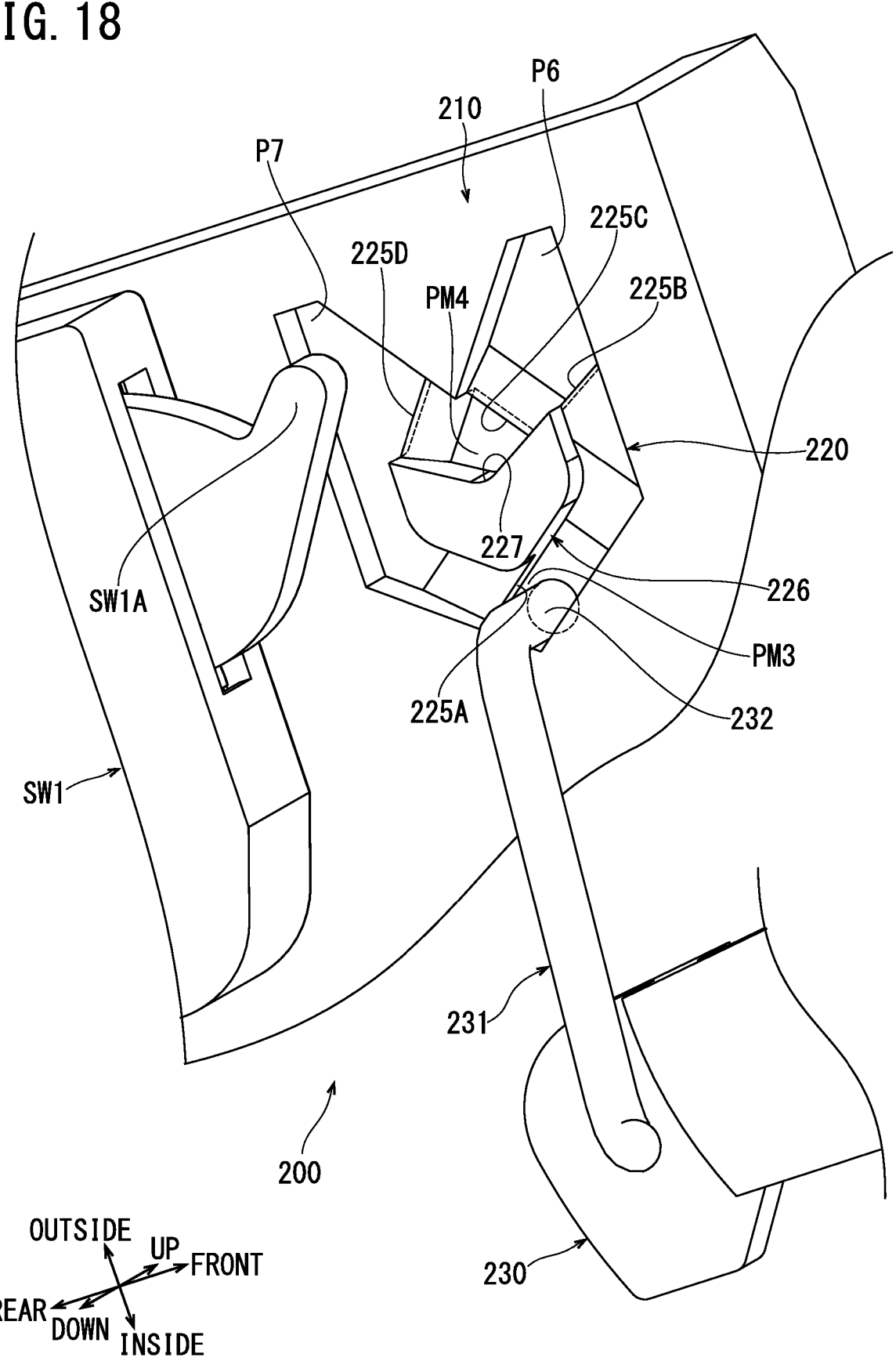
FIG. 18 is a partial oblique diagram that shows an enlargement of a portion of FIG. 17.

As shown in FIGS. 17 and 18, the second intermittent-guide part 210 is a flat plate part that extends forward of the switch SW1 from a support wall supporting the switch SW1 within the housing 90 and extends in the vehicle inside-outside direction. That is, the second intermittent-guide part 210 is provided on the housing 90 such that it is non-displaceable (stationary) relative to the housing 90.

The second intermittent profile 220 for guiding the second guided part 232 of the transmitting rod 231 is formed on/in the second intermittent-guide part 210. The second intermittent profile 220 is a groove that is recessed upward from the bottom surface of the second intermittent-guide part 210.

The second intermittent profile 220 includes sixth position P6, seventh position P7, maximum separation position PM3, and intermediate stopping position PM4.

Sixth position P6 and seventh position P7 are each substantially cul-de-sac-shaped on the end-edge side of the second intermittent-guide part 210 on the outer side of the vehicle. Seventh position P7 is at a position nearer to the switch SW1 than sixth position P6.

Maximum separation position PM3 has a shape recessed toward the inner side of the vehicle at a position farthest away on the inner side of the vehicle from sixth position P6 and seventh position P7 on the second intermittent-guide part 210.

Intermediate stopping position PM4 is located between maximum separation position PM3 and a range that includes sixth position P6 and seventh position P7.

When the transmitting lever 230 interacts with the linear reciprocating motion of the linearly-movable shaft 10, the second intermittent profile 220 causes the second guided part 232 of the transmitting rod 231 to cycle (move) around, in order, the positions of the maximum separation position PM3, sixth position P6, intermediate stopping position PM4, and seventh position P7.

That is, as shown in FIG. 17, when the linearly-movable shaft 10 is in the first position, the second guided part 232 is in (at) maximum separation position PM3.

When the linearly-movable shaft 10 displaces from the first position shown in FIG. 17 to the third position shown in FIG. 19, passing the second position, the second guided part 232 displaces from maximum separation position PM3 to sixth position P6.

Figure 20:
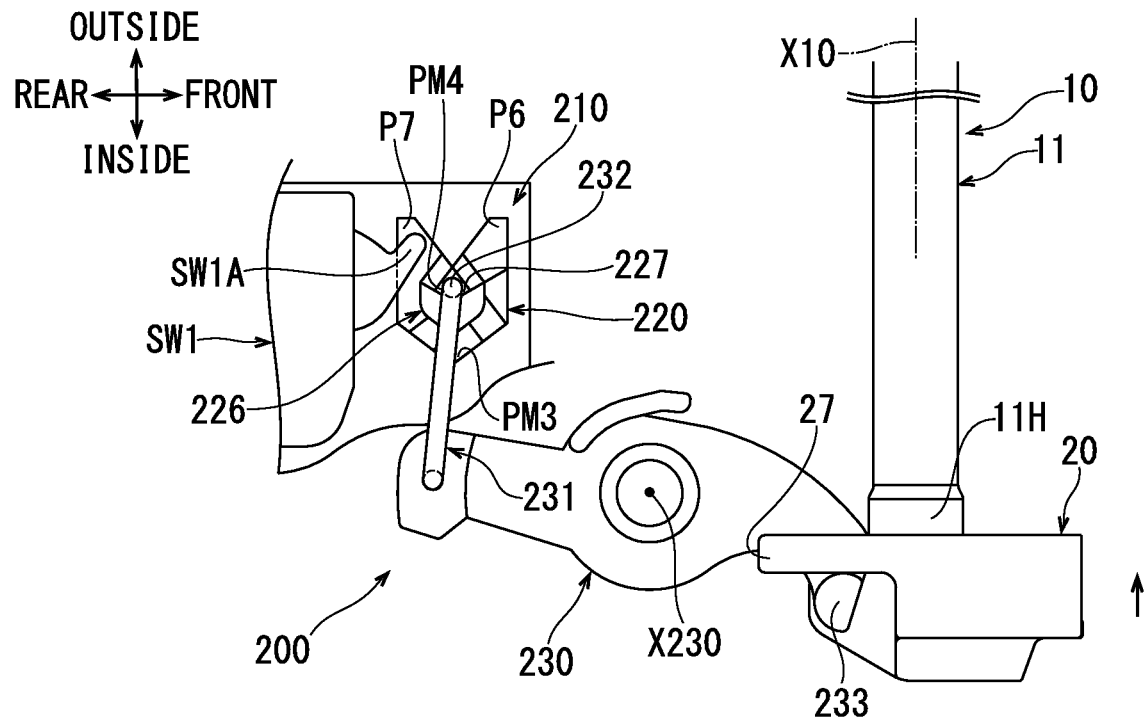
FIG. 20 is a schematic diagram used to describe coordinated movements of the linearly-movable shaft, the second intermittent-guide part, and the second interacting mechanism.

When the linearly-movable shaft 10 displaces from the third position shown in FIG. 19 to the second position shown in FIG. 20, the second guided part 232 displaces from sixth position P6 to intermediate stopping position PM4.

When the linearly-movable shaft 10 displaces from the second position shown in FIG. 20 to the third position shown in FIG. 21, the second guided part 232 displaces from intermediate stopping position PM4 to seventh position P7.

When the linearly-movable shaft 10 displaces from the third position shown in FIG. 21 to the first position shown in FIG. 17, the second guided part 232 displaces from seventh position P7 to maximum separation position PM3.

As shown in FIG. 18, in order for the second guided part 232 to be caused to reliably cycle (move) around, in order, maximum separation position PM3, sixth position P6, intermediate stopping position PM4, and seventh position P7, an island part 226 and reverse-motion preventing steps 225A, 225B, 225C, 225D are formed on the second intermittent profile 220.

The island part 226 is formed in the center of the second intermittent profile 220. The island part 226 includes a recessed part 227. The recessed part 227 is recessed toward maximum separation position PM3 between sixth position P6 and seventh position P7.

When the second guided part 232 is guided to intermediate stopping position PM4, it is held at intermediate stopping position PM4 by entering the recessed part 227 of the island part 226.

The reverse-motion preventing step 225A restricts (blocks) the reverse motion of the second guided part 232 from maximum separation position PM3 to seventh position P7. The reverse-motion preventing step 225B restricts (blocks) the reverse motion of the second guided part 232 from sixth position P6 to maximum separation position PM3. The reverse-motion preventing step 225C restricts (blocks) the reverse motion of the second guided part 232 from intermediate stopping position PM4 to sixth position P6. The reverse-motion preventing step 225D restricts (blocks) the reverse motion of the second guided part 232 from seventh position P7 to intermediate stopping position PM4.

In this manner, when the linearly-movable shaft 10 repeatedly performs the action of moving to the third position, the second intermittent-guide part 210 guides the second guided part 232 alternately to sixth position P6 and seventh position P7, and when the second guided part 232 is guided to seventh position P7, the second guided part 232 presses the movable protrusion SW1A to cause the switch SW1 to switch to the connected state.

With the linear reciprocating-motion apparatus of Working Example 3, the operation of opening/closing the lid body 5 is performed in the same manner as with the linear reciprocating-motion apparatus 1 of Working Example 1.

More specifically, when the user performs a manual closing operation for closing the lid body 5 and thereafter removes their hand from the lid body 5, the second guided part 232 displaces from maximum separation position PM3 shown in FIG. 17 to sixth position P6 shown in FIG. 19 and thereafter displaces from sixth position P6 to intermediate stopping position PM4 shown in FIG. 20. During this period, too, the second guided part 232 separates from the movable protrusion SW1A of the switch SW1, and the switch SW1 is put into the disconnected state. For this reason, the electric motor 61 of the electric actuator 60 is not energized.

In order to pivot the lid body 5 held at the closed position shown in FIG. 2 to the open position, the user performs a manual opening operation by pressing in the lid body 5 from the closed position to the pressed-in position shown in FIG. 3; that is, the user performs the specific operation for moving the linearly-movable shaft 10 to the first position. Thereby, while the stopper 50 is disposed in the blocking position, the linearly-movable shaft 10 is moved from the second position to the third position as shown in FIG. 9C.

At this time, the second guided part 232 displaces from intermediate stopping position PM4 shown in FIG. 20 to seventh position P7 shown in FIG. 21, and the second guided part 232 presses the movable protrusion SW1A of the switch SW1, thereby causing the switch SW1 to switch to the connected state. As a result thereof, the electric motor 61 of the electric actuator 60 is energized and pivots the stopper 50 to the nonblocking position shown by chain double-dashed lines in FIG. 9D.

That is, the electric actuator 60 is energized in response to the manual opening operation for displacing the lid body 5 to the open position (i.e. the specific operation), and thereby displaces the stopper 50 to the nonblocking position. In addition, when the linearly-movable shaft 10 repeatedly performs the action of moving to the third position, the intermittent mechanism 200 enters the specific state once every two times, that is, the state in which the second intermittent profile 220 of the second intermittent-guide part 210 has guided the second guided part 232 to seventh position P7. Then, the switch SW1 switches from the disconnected state to the connected state when the specific state has been achieved.

With the linear reciprocating-motion apparatus of Working Example 3 configured as described above, the electrical circuitry for the switch SW1 can be simplified and a further improvement in reliability can be achieved in the same manner as with the linear reciprocating-motion apparatus 1 of Working Examples 1 and 2.

In addition, because the linear reciprocating-motion apparatus includes the intermittent mechanism 200, which comprises the second intermittent-guide part 210, the transmitting lever 230, and the transmitting rod 231, it can reliably perform the action of switching the switch SW1 from the disconnected state to the connected state once every two times that the lid body 5 is manually pressed to the pressed-in position.

Although the present invention was described above based on Working Examples 1-3, the present invention is not limited to the above-mentioned Working Examples 1-3 and of course is applicable when changed appropriately within a scope that does not depart from the gist thereof.

For example, in Working Examples 1-3, two exemplary, non-limiting embodiments of the intermittent mechanism 100, 200 were explained in detail. Of course, these intermittent mechanisms 100, 200 may be modified in a variety of ways without departing from the scope or spirit of the present teachings as long as the structure(s) of the intermittent mechanism remain(s) capable of interacting with the linear reciprocating motion of the movable member and is (are) put into a specific state, as described above, once out of every two times that the movable member repeats the operation (movement) of moving to the third position. All such modifications are deemed to be within the scope of the present teachings.

In Working Examples 1-3, the switch is switched from the disconnected state to the connected state upon achieving the specific state, but the present invention is not limited to this configuration. For example, the switch may also be switched from the connected state to the disconnected state upon achieving the specific state. In addition, for example, the switching of the switch from the disconnected state to the connected state upon achieving the specific state also may be used to switch the power ON and OFF to a light that illuminates the vicinity of the housing.

In Working Examples 1 and 2, the first interacting mechanism is the transmitting lever 130, but the present invention is not limited to this configuration. For example, the first interacting mechanism may also be constituted by a plurality of link members.

In Working Examples 1-3, the wiring for energizing the electric motor 61 is wired so as to transit the switch SW1 along the way, and therefore the connected state of the switch SW1 has a one-to-one correspondence with the rotation of the electric motor 61, and the disconnected state of the switch SW1 has a one-to-one correspondence with the halting of the electric motor 61, but the present invention is not limited to this configuration. For example, the wiring for energizing the electric motor 61 and the wiring of the switch SW1 may be separately routed to the control part (FIG. 1), and a simple relay circuit or the like on the control-part side may perform simple control. At this time, the simple control may incorporate the ON/OFF operation of other switches, sensors, or the like, and may control the energizing of the electric motor 61.

In Working Examples 1-3, the fuel-filling hole 8H is disposed inside the opening 8, but the present invention is not limited to this configuration. For example, a charging connector (electronic charging port for an electric vehicle) or the like may instead be disposed inside the opening. In addition, in Working Examples 1-3, electrical connection to the control part is achieved via the wire harness W1 that extends from the housing 90, but the present invention is not limited to this configuration. For example, an electrical connector may be provided in the housing and that electrical connector may be connected to a matching electrical connector provided inside the vehicle body.

The present invention may be utilized in, for example, a vehicle, such as an automobile, bus, or industrial vehicle, or in industrial machinery, and the like.

Furthermore, it is noted that the fan-shaped gear 56 and the worm gear 66 are preferably designed to provide a "backdriving" worm gear (pinion) arrangement, in which rotation of the fan-shaped gear 56 (driven component) caused by an external load (e.g., the compression-coil spring 50S that biases/urges the stopper 50 to pivot towards the blocking position) is applied to the worm gear 66 (driving component, also known as a pinion) when the electric motor 61 is not being energized to drive the worm gear 66. That is, a "backdriving" operation occurs when the fan-shaped gear (arcuate gear) 56 actively drives (rotates) the worm gear (pinion) owing to the fact that the worm gear 66 is free to rotate when the electric motor 61 is not being driven (energized). Such an arrangement is known as a non-self-locking worm gear (pinion) arrangement and may be constructed by appropriately designing the outer diameter of the worm gear (pinion) 66, the thread lead of the worm gear 66, the resulting thread angle of the worm gear 66, as well as providing low friction surface finishes (low coefficient of friction) on the fan-shaped gear 56 and the worm gear 66. For example, the thread angle of the worm gear 66 is preferably equal to or greater than 10°. The worm gear 66 and/or fan-shaped gear 56 may be lubricated to further reduce friction. Thus, referring to FIG. 5, energization (driving) of the electric motor 61 causes the worm gear 66 to rotate and pivot the fan-shaped gear 56 (and thus the stopper 50) in the counterclockwise direction toward the nonblocking position of the stopper 50. When the energization is stopped, the worm gear 66 is free to rotate in the opposite rotational direction, so that the fan-shaped gear 56 (and thus the stopper 50) pivot in the clockwise direction toward the blocking position of the stopper 50 owing to the biasing force of the compression-coil spring 50S that is normally biasing (pivoting) the stopper 50 toward the blocking position. Generally speaking, a non self-locking worm gear arrangement can be designed by setting the lead angle of the worm gear 66 to be greater than the friction angle, which is the arc tangent of the coefficient of friction of the contacting surfaces of the worm gear 66 and the fan-shaped gear 56.

The term "intermittent" has been used to describe the function of mechanisms 100, 200 of the present teachings. It is noted that mechanism 100, 200 has the primary function of changing its output (i.e. actuating or pressing the switch SW1) in a manner that alternates with a mechanical input (i.e. movement of the linearly-movable shaft 10 and rotary shaft 30 to the pressed in position of the lid body 5). Thus, "intermittent mechanism" 100, 200 also may be called, e.g., alternating-output mechanism that serves the function of changing its output only after every second input.

Additional aspects of the present teachings include, but are not limited to:

1. A linear reciprocating-motion apparatus (1) comprising:
   a housing (90);
   a movable member (10, 30) that is supported by the housing (90), is capable of undergoing linear reciprocating motion in a range that includes: a first position, a second position, and a third position that is separated from the first position more than the second position, and is biased toward the first position;
   a stopper (50) that: (i) is supported by the housing (90), (ii) is displaceable between a blocking position at which movement of the movable member (10, 30) from the second position to the first position is prohibited and a nonblocking position at which movement of the movable member (10, 30) from the second position to the first position is permitted, (iii) is biased toward the blocking position, and (iv) is displaced to the nonblocking position in response to a specific operation for moving the movable member (10, 30) to the first position;
   an intermittent mechanism (100, 200) that interacts with the linear reciprocating motion of the movable member (10, 30) and assumes a specific state once every two times when the movable member (10, 30) repeats the action of moving to the third position; and
   a switch (SW1) that is provided in the housing (90) and, when the specific state is assumed, is switched from one of a disconnected state and a connected state to the other of the disconnected state and the connected state.

2. The linear reciprocating-motion apparatus (1) according to claim 1, wherein:
   the intermittent mechanism (100) comprises:
   a first intermittent-guide part (110) that is displaceably supported by the housing (90), the first intermittent-guide part (110) having a first intermittent profile (120), which includes a fourth position (P4) and a fifth position (P5), formed thereon; and
   a first interacting mechanism (130) that: (i) is displaceably supported by the housing (90), (ii) includes a first guided part (131), which is guided by the first intermittent profile (120), and (iii) is adapted to displace the first guided part (131) upon interacting with the linear reciprocating motion of the movable member (10, 30);
   wherein, each time the first intermittent-guide part (110) is repetitively moved by the movable member (10, 30) moving to the third position, the first intermittent-guide part (110) guides the first guided part (131) alternately to the fourth position (P4) or to the fifth position (P5), and
   the point in time at which the first guided part (131) has been guided to the fifth position (P5) is defined as the specific state.

3. The linear reciprocating-motion apparatus (1) according to claim 2, wherein:
   the first intermittent profile (120) includes a maximum separation position (PM1) that is most separated from the fourth position (P4) and the fifth position (P5), and an intermediate stopping position (PM2; PM2A) that is positioned between the maximum separation position (PM1) and a range that includes the fourth position (P4) and the fifth position (P5);
   the first intermittent-guide part (110) is biased so as to displace the fourth position (P4) and the fifth position (P5) of the first intermittent profile (120) in a direction away from the first interacting mechanism (130), and the fourth position (P4) is spaced apart from the first interacting mechanism (130) farther than the fifth position (P5);
   the first guided part (131) is adapted to cycle around, in order, the maximum separation position (PM1), the fourth position (P4), the intermediate stopping position (PM2; PM2A), and the fifth position (P5); and
   a restricting part (128) is formed on the first intermittent profile (120) and is disposed between the maximum separation position (PM1) and the fourth position (P4), the restricting part (128) being adapted to restrict (block) a change in path of the first guided part (131) toward the intermediate stopping position (PM2; PM2A) as the first guide part (131) is being guided from the maximum separation position (PM1) to the fourth position (P4).

4. The linear reciprocating-motion apparatus (1) according to claim 3, wherein, when guided to the intermediate stopping position (PM2), the first guided part (131) is held at the intermediate stopping position (PM2) by being pressed against a guide wall (129) that extends from the fifth position (P5) on the first intermittent profile (120) toward the maximum separation position (PM1).

5. The linear reciprocating-motion apparatus (1) according to claim 3, wherein:
   an island part (126) is formed in the center of the first intermittent profile (120) and includes the restricting part (128) and a recessed part (127) that is recessed toward the maximum separation position (PM1) on the fifth-position side of the restricting part (128);
   and the first guided part (131) is held at the intermediate stopping position (PM2A) by entering the recessed part (127) of the island part (126) when guided to the intermediate stopping position (PM2A).

6. The linear reciprocating-motion apparatus (1) according to claim 1, wherein:
   the intermittent mechanism (200) comprises:
   a second intermittent-guide part (210) that is non-displaceably provided on the housing (90), the second intermittent-guide part (210) having a second intermittent profile (220), which includes a sixth position (P6) and a seventh position (P7), formed thereon; and a second interacting mechanism (230, 231) that: (i) is displaceably supported by the housing (90), (ii) includes a second guided part (232), which is guided by the second intermittent profile (220), and (iii) is adapted to displace the second guided part (232) upon interacting with the linear reciprocating motion of the movable member (10, 30);

wherein, each time the movable member (10, 30) repetitively moves to the third position, the second intermittent-guide part (210) guides the second guided part (232) alternately to the sixth position (P6) or to the seventh position (P7), and the point in time at which the second guided part (232) has been guided to the seventh position (P7) is defined as the specific state.

7. The linear reciprocating-motion apparatus (1) according to any one of claims 1-6, wherein:

the linear reciprocating-motion apparatus (1) is used in a vehicle that is to be provided between an opening (8) on a vehicle body (9) and a lid body (5) adapted to open and close the opening (8);

the lid body (5) is displaceable in a range that includes: an open position at which the opening (8) is open, a closed position at which the opening (8) is closed, and a pressed-in position at which the lid body (5) is pressed in from the closed position to the side opposite the open position;

in the linear reciprocating-motion apparatus (1), the housing (90) is provided on the vehicle body (9);

the movable member (10, 30) extends centered on an axial center (X10) passing through the opening (8) and is capable of undergoing linear reciprocating motion in the direction of the axial center (X10) in a range that includes: the first position corresponding to the open position, the second position corresponding to the closed position, and the third position corresponding to the pressed-in position; and the specific operation is a manual opening operation for displacing the lid body (5) to the open position.

8. The linear reciprocating-motion apparatus (1) according to claim 7, further comprising an electric actuator (60) that (i) is provided in the housing (90), (ii) is operably connected to the stopper (50) and (iii) displaces the stopper (50) to the nonblocking position when energized in response to the manual opening operation.

9. The linear reciprocating-motion apparatus (1) according to claim 7 or 8, wherein:

the movable member (10, 30) comprises:

a linearly-movable shaft (10) that (i) extends centered on the axial center (X10), (ii) is supported by the housing (90) such that it is nonrotatable around the axial center (X10) and is capable of undergoing linear reciprocating motion in the direction of the axial center (X10) in the range that includes the first position, the second position, and the third position, and (iii) is biased toward the first position; and a rotary shaft (30) that (i) extends centered on the axial center (X10), (ii) is supported by the linearly-movable shaft (10) such that it is rotatable around the axial center (X10) and is capable of undergoing linear reciprocating motion in the direction of the axial center (X10), (iii) is rotatable to a latched position that latches the lid body (5) when the linearly-movable shaft (10) is disposed in the second position or the third position and (iv) is rotatable to an unlatched position that does not latch the lid body (5) when the linearly-movable shaft (10) is disposed in the first position.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatuses and actuators for opening and closing a lid (lid body) of a vehicle.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Linear reciprocating-motion apparatus
90 Housing
10, 30 Movable member (10: linearly-movable shaft; 30: rotary shaft)
50 Stopper
100, 200 Intermittent mechanism
SW1 Switch
120 First intermittent profile
110 First intermittent-guide part
131 First guided part
130 First interacting mechanism (transmitting lever)
P4 Fourth position
P5 Fifth position
PM1, PM3 Maximum separation position
PM2, PM2A, PM4 Intermediate stopping position
128 Restricting part
129 Guide wall
127 Recessed part
126 Island part
220 Second intermittent profile
210 Second intermittent-guide part
232 Second guided part
230, 231 Second interacting mechanism (230: transmitting lever; 231: transmitting rod)
P6 Sixth position
P7 Seventh position
9 Vehicle body
8 Opening
5 Lid (lid body)

X10 Axial center
60 Electric actuator

The invention claimed is:

1. A linear reciprocating-motion apparatus comprising:
a housing;
at least one movable member supported by the housing such that it is capable of undergoing linear reciprocating motion in a linear range that includes: a first position, a second position, and a third position that is separated from the first position more than the second position, the at least one movable member being biased toward the first position;
a stopper that: (i) is supported by the housing, (ii) is displaceable between a blocking position at which movement of the at least one movable member from the second position to the first position is prohibited and a nonblocking position at which movement of the at least one movable member from the second position to the first position is permitted, (iii) is biased toward the blocking position, and (iv) is configured to be displaced to the nonblocking position in response to a specific manual operation for moving the at least one movable member to the first position;
a switch provided in the housing and having a movable protrusion; and
an intermittent mechanism configured to interact with the linear reciprocating motion of the at least one movable member such that, in response to the specific manual operation, the intermittent mechanism assumes a specific state that switches the switch from one of a disconnected state and a connected state to the other of the disconnected state and the connected state once every two times that the at least one movable member is moved to the third position;
wherein:
the intermittent mechanism comprises:
a first intermittent-guide part that is pivotably supported by the housing, the first intermittent-guide part having a first intermittent profile; and
a first interacting mechanism that: (i) is displaceably supported by the housing, (ii) includes a first guided part that is guided by the first intermittent profile, and (iii) is configured to displace the first guided part upon interacting with the linear reciprocating motion of the at least one movable member;
the first intermittent profile has defined thereon a fourth position, a fifth position, a maximum separation position that is most spaced apart from the fourth position and the fifth position, and an intermediate stopping position that is positioned between the maximum separation position and a range that includes the fourth position and the fifth position;
the first guided part is configured to cycle around, in order, the maximum separation position, the fourth position, the intermediate stopping position, and the fifth position;
each time the first intermittent-guide part is repetitively moved by the at least one movable member moving to the third position, the first intermittent-guide part is configured to guide the first guided part alternately to the fourth position or to the fifth position;
guiding the first guided part to the fifth position is defined as the specific state; and
the switch is configured such that, when the specific state is assumed by guiding the first guided part to the fifth position, the first intermittent-guide part presses the movable protrusion and causes the switch to switch from one of a disconnected state and a connected state to the other of the disconnected state and the connected state.

2. The linear reciprocating-motion apparatus according to claim 1, wherein:
the first intermittent-guide part is biased so as to displace the fourth position and the fifth position of the first intermittent profile in a direction away from the first interacting mechanism, and the fourth position is spaced apart farther from the first interacting mechanism than the fifth position; and
a restricting part is defined on the first intermittent profile between the maximum separation position and the fourth position, the restricting part being configured to block a change in path of the first guided part as the first guided part is being guided from the maximum separation position to the fourth position toward the intermediate stopping position.

3. The linear reciprocating-motion apparatus according to claim 2, wherein, when guided to the intermediate stopping position, the first guided part is configured to be held at the intermediate stopping position by being pressed against a guide wall that extends from the fifth position on the first intermittent profile toward the maximum separation position.

4. The linear reciprocating-motion apparatus according to claim 2, wherein:
the linear reciprocating-motion apparatus is configured to function as a linear reciprocating-motion apparatus for use in a vehicle that is to be provided between an opening on a vehicle body and a lid configured to open and close the opening;
the lid is displaceable in a pivot range that includes: an open position at which the opening is open, a closed position at which the opening is closed, and a pressed-in position at which the lid is pressed in from the closed position to the side opposite the open position;
the housing is configured to be attached to the vehicle body;
the at least one movable member extends centered around an axial center passing through the opening and is configured to undergo linear reciprocating motion in the direction of the axial center in the linear range that includes: the first position corresponding to the open position, the second position corresponding to the closed position, and the third position corresponding to the pressed-in position; and
the specific manual operation is a manual opening operation for displacing the lid to the open position.

5. The linear reciprocating-motion apparatus according to claim 4, further comprising an electric actuator that (i) is provided in the housing, (ii) is operably connected to the stopper and (iii) is configured to displace the stopper to the nonblocking position when energized in response to the manual opening operation.

6. The linear reciprocating-motion apparatus according to claim 5, wherein the at least one movable member comprises:
a linearly-movable shaft that (i) extends centered on the axial center, (ii) is supported by the housing such that the linearly-movable shaft is nonrotatable around the axial center and is configured to undergo linear reciprocating motion in the direction of the axial center in the linear range that includes the first position, the second position, and the third position, and (iii) is biased toward the first position; and a rotary shaft that (i) extends centered on the axial center, (ii) is supported by the linearly-movable shaft such that the rotary shaft is rotatable around the axial center and is configured to undergo linear reciprocating motion in the direction of the axial center, (iii) is rotatable to a latched position that latches the lid when the linearly-movable shaft is disposed in the second position or the third position and (iv) is rotatable to an unlatched position that does not latch the lid when the linearly-movable shaft is disposed in the first position.

7. The linear reciprocating-motion apparatus according to claim 2, wherein:
   an island part is provided in the center of the first intermittent profile;
   the island part includes the restricting part and a recessed part that is recessed toward the maximum separation position on the fifth-position side of the restricting part; and
   the first guided part is configured to be held at the intermediate stopping position by entering the recessed part of the island part when guided to the intermediate stopping position.

8. The linear reciprocating-motion apparatus according to claim 1, wherein:
   the linear reciprocating-motion apparatus is configured to function as a linear reciprocating-motion apparatus for use in a vehicle that is to be provided between an opening on a vehicle body and a lid configured to open and close the opening;
   the lid is displaceable in a pivot range that includes: an open position at which the opening is open, a closed position at which the opening is closed, and a pressed-in position at which the lid is pressed in from the closed position to the side opposite the open position;
   the housing is configured to be attached to the vehicle body;
   the at least one movable member extends centered around an axial center passing through the opening and is configured to undergo linear reciprocating motion in the direction of the axial center in the linear range that includes: the first position corresponding to the open position, the second position corresponding to the closed position, and the third position corresponding to the pressed-in position; and
   the specific manual operation is a manual opening operation for displacing the lid to the open position.

9. The linear reciprocating-motion apparatus according to claim 1, further comprising an electric actuator that (i) is provided in the housing, (ii) is operably connected to the stopper and (iii) is configured to displace the stopper to the nonblocking position when energized in response to the specific manual operation.

10. The linear reciprocating-motion apparatus according to claim 1, wherein the at least one movable member comprises:
    a linearly-movable shaft that (i) extends centered on an axial center, (ii) is supported by the housing such that the linearly-movable shaft is nonrotatable around the axial center and is configured to undergo linear reciprocating motion in the direction of the axial center in the linear range that includes the first position, the second position, and the third position, and (iii) is biased toward the first position; and
    a rotary shaft that (i) extends centered on the axial center, (ii) is supported by the linearly-movable shaft such that the rotary shaft is rotatable around the axial center and is configured to undergo linear reciprocating motion in the direction of the axial center, (iii) is rotatable to a latched position that latches a lid when the linearly-movable shaft is disposed in the second position or the third position and (iv) is rotatable to an unlatched position that does not latch the lid when the linearly-movable shaft is disposed in the first position.

11. The linear reciprocating-motion apparatus according to claim 1, wherein the linear reciprocating-motion apparatus is configured such that:
    when the first guided part is in the maximum separation position, the at least one movable member is positioned in the first position;
    when the first guided part is between the maximum separation position and the fourth position, the at least one movable member is in the second position;
    when the first guided part is in the fourth position, the at least one movable member is in the third position;
    when the first guided part is in the intermediate stopping position, the at least one movable member is in the second position; and
    when the first guided part is in the fifth position, the at least one movable member is in the third position.

12. A linear reciprocating-motion apparatus, comprising:
    a housing;
    at least one movable member supported by the housing such that it is capable of undergoing linear reciprocating motion in a linear range that includes: a first position, a second position, and a third position that is separated from the first position more than the second position, the at least one movable member being biased toward the first position;
    a stopper that: (i) is supported by the housing, (ii) is displaceable between a blocking position at which movement of the at least one movable member from the second position to the first position is prohibited and a nonblocking position at which movement of the at least one movable member from the second position to the first position is permitted, (iii) is biased toward the blocking position, and (iv) is configured to be displaced to the nonblocking position in response to a specific manual operation for moving the at least one movable member to the first position;
    a switch provided in the housing and having a movable protrusion; and
    an intermittent mechanism configured to interact with the linear reciprocating motion of the at least one movable member such that, in response to the specific manual operation, the intermittent mechanism assumes a specific state that switches the switch from one of a disconnected state and a connected state to the other of the disconnected state and the connected state once every two times that the at least one movable member is moved to the third position;
    wherein:
    the intermittent mechanism comprises:
      a second intermittent-guide part that is provided on the housing so as to be immovable relative to the housing, the second intermittent-guide part having a second intermittent profile; and
      a second interacting mechanism that: (i) is displaceably supported by the housing, (ii) includes a second guided part that is guided by the second intermittent profile, and (iii) is configured to displace the second guided part upon interacting with the linear reciprocating motion of the at least one movable member;
    the second intermittent profile has defined thereon a sixth position, a seventh position, a maximum separation position that is most separated apart from the sixth position and the seventh position, and an intermediate stopping position that is positioned between the maximum separation position and a range that includes the sixth position and the seventh position;

the second guided part is configured to cycle around, in order, the maximum separation position, the sixth position, the intermediate stopping position, and the seventh position;

each time the at least one movable member repetitively moves to the third position, the second intermittent-guide part is configured to guide the second guided part alternately to the sixth position or to the seventh position;

guiding the second guided part to the seventh position is defined as the specific state; and the switch is configured such that, when the specific state is assumed by guiding the second guided part to the seventh position, the second guided part presses the movable protrusion and causes the switch to switch from one of a disconnected state and a connected state to the other of the disconnected state and the connected state.

13. The linear reciprocating-motion apparatus according to claim 12, wherein:

the linear reciprocating-motion apparatus is configured to function as a linear reciprocating-motion apparatus for use in a vehicle that is to be provided between an opening on a vehicle body and a lid configured to open and close the opening;

the lid is displaceable in a pivot range that includes: an open position at which the opening is open, a closed position at which the opening is closed, and a pressed-in position at which the lid is pressed in from the closed position to the side opposite the open position;

the housing is configured to be attached to the vehicle body;

the at least one movable member extends centered around an axial center passing through the opening and is configured to undergo linear reciprocating motion in the direction of the axial center in the linear range that includes: the first position corresponding to the open position, the second position corresponding to the closed position, and the third position corresponding to the pressed-in position; and the specific manual operation is a manual opening operation for displacing the lid to the open position.

14. The linear reciprocating-motion apparatus according to claim 13, further comprising an electric actuator that (i) is provided in the housing, (ii) is operably connected to the stopper and (iii) is configured to displace the stopper to the nonblocking position when energized in response to the manual opening operation.

15. The linear reciprocating-motion apparatus according to claim 14, wherein the at least one movable member comprises:

a linearly-movable shaft that (i) extends centered on the axial center, (ii) is supported by the housing such that the linearly-movable shaft is nonrotatable around the axial center and is configured to undergo linear reciprocating motion in the direction of the axial center in the linear range that includes the first position, the second position, and the third position, and (iii) is biased toward the first position; and a rotary shaft that (i) extends centered on the axial center, (ii) is supported by the linearly-movable shaft such that the rotary shaft is rotatable around the axial center and is configured to undergo linear reciprocating motion in the direction of the axial center, (iii) is rotatable to a latched position that latches the lid when the linearly-movable shaft is disposed in the second position or the third position and (iv) is rotatable to an unlatched position that does not latch the lid when the linearly-movable shaft is disposed in the first position.

16. The linear reciprocating-motion apparatus according to claim 12, wherein the linear reciprocating-motion apparatus is configured such that:

when the second guided part is in the maximum separation position, the at least one movable member is in the first position;

when the second guided part is between the maximum separation position and the sixth position, the at least one movable member is in the second position;

when the second guided part is in the sixth position, the at least one movable member is in the third position;

when the second guided part is in the intermediate stopping position, the at least one movable member is in the second position; and when the second guided part is in the seventh position, the at least one movable member is in the third position.

* * * * *